US008320398B2

(12) United States Patent
Li et al.

(10) Patent No.: US 8,320,398 B2
(45) Date of Patent: Nov. 27, 2012

(54) PAGING A PEER IN A PEER-TO-PEER COMMUNICATION NETWORK

(75) Inventors: Junyi Li, Bedminster, NJ (US); Rajiv Laroia, Far Hills, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1017 days.

(21) Appl. No.: 11/775,859

(22) Filed: Jul. 10, 2007

(65) Prior Publication Data

US 2009/0017797 A1    Jan. 15, 2009

(51) Int. Cl.
*H04L 12/28* (2006.01)
*H04L 12/43* (2006.01)
*H04J 3/06* (2006.01)
*H04J 3/02* (2006.01)
*H04W 68/00* (2009.01)
*H04W 4/00* (2009.01)
*H04B 7/00* (2006.01)

(52) U.S. Cl. ........ 370/462; 370/458; 370/461; 370/350; 370/254; 455/434; 455/515; 455/458

(58) Field of Classification Search .................. 455/434, 455/515, 516, 517, 41.2, 41.3, 458; 370/350, 370/252, 254, 278, 330, 495.4, 461, 462, 370/458
See application file for complete search history.

(56) References Cited

U.S. PATENT DOCUMENTS

| | | | |
|---|---|---|---|
| 5,515,366 A | 5/1996 | Chieu et al. | |
| 6,236,649 B1 | 5/2001 | Jun | |
| 6,718,395 B1 | 4/2004 | Ziegler | |
| 6,745,056 B2 * | 6/2004 | Wang et al. | 455/574 |
| 6,804,542 B1 | 10/2004 | Haartsen | |
| 6,968,153 B1 | 11/2005 | Heinonen et al. | |
| 7,711,377 B2 * | 5/2010 | Laroia et al. | 455/458 |
| 7,792,988 B2 | 9/2010 | Van Datta | |
| 7,813,373 B2 | 10/2010 | Joshi et al. | |
| 2002/0163894 A1 * | 11/2002 | Alapuranen et al. | 370/335 |
| 2004/0063451 A1 | 4/2004 | Bonta et al. | |
| 2004/0133640 A1 | 7/2004 | Yeager et al. | |
| 2005/0153714 A1 | 7/2005 | Subrahmanya | |
| 2006/0013160 A1 * | 1/2006 | Haartsen | 370/328 |
| 2009/0017844 A1 | 1/2009 | Li et al. | |

FOREIGN PATENT DOCUMENTS

| | | |
|---|---|---|
| CN | 1123993 A | 6/1996 |
| EP | 0713345 | 5/1996 |
| GB | 2290677 | 1/1996 |

(Continued)

OTHER PUBLICATIONS

International Search Report, PCT/US08/069042, International Search Authority, European Patent Office, Oct. 28, 2008.

(Continued)

*Primary Examiner* — Wesley Kim
(74) *Attorney, Agent, or Firm* — James K. O'Hare

(57) ABSTRACT

Systems and methodologies are described that facilitate paging a peer in a peer-to-peer communication network. Paging messages may be communicated directly between a wireless terminal and its peer(s). Further, the wireless terminal may monitor for incoming paging messages during subinterval(s) of a paging interval as a function of an identifier of the wireless terminal. Moreover, the wireless terminal may transmit a paging message to a peer (e.g., detected and/or identified during peer discovery) during subinterval(s) of the paging interval as a function of an identifier of the peer.

43 Claims, 16 Drawing Sheets

FOREIGN PATENT DOCUMENTS

| | | |
|---|---|---|
| JP | 8097821 A | 4/1996 |
| JP | 08204683 | 8/1996 |
| JP | 9107583 | 4/1997 |
| JP | 11088960 | 3/1999 |
| JP | 2001156929 A | 6/2001 |
| JP | 2001157280 A | 6/2001 |
| JP | 2003030772 A | 1/2003 |
| JP | 2003503920 | 1/2003 |
| JP | 2005223722 A | 8/2005 |
| KR | 100150354 | 11/1998 |
| WO | 0059138 | 10/2000 |
| WO | WO02039710 A1 | 5/2002 |
| WO | WO2005125234 | 12/2005 |
| WO | WO2006016329 A1 | 2/2006 |
| WO | WO2007044597 | 4/2007 |

OTHER PUBLICATIONS

Written Opinion, PCT/US08/069042, International Search Authority, European Patent Office, Oct. 28, 2008.

* cited by examiner

PAGING A PEER IN A PEER-TO-PEER COMMUNICATION NETWORK

CROSS-REFERENCE TO RELATED APPLICATIONS

This application is related to co-pending U.S. patent application Ser. No. 11/775,860, entitled "MULTIHOP PAGING OF A PEER IN A PEER-TO-PEER COMMUNICATION NETWORK", which was filed on the same day as the subject application.

BACKGROUND

I. Field

The following description relates generally to wireless communications, and more particularly to enabling peers to directly page each other in a peer-to-peer network.

II. Background

Wireless communication systems are widely deployed to provide various types of communication; for instance, voice and/or data may be provided via such wireless communication systems. A typical wireless communication system, or network, can provide multiple users access to one or more shared resources. For instance, a system may use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Common wireless communication systems employ one or more base stations that provide a coverage area. A typical base station can transmit multiple data streams for broadcast, multicast and/or unicast services, wherein a data stream may be a stream of data that can be of independent reception interest to a wireless terminal. A wireless terminal within the coverage area of such base station can be employed to receive one, more than one, or all the data streams carried by the composite stream. Likewise, a wireless terminal can transmit data to the base station or another wireless terminal.

Wireless communication systems leverage various portions of wireless spectrum for transferring data. However, wireless spectrum is an expensive and valuable resource. For example, significant costs may be incurred by a company desiring to operate a wireless communication system over a portion of the wireless spectrum (e.g., within the licensed spectrum). Further, conventional techniques typically provide inefficient utilization of wireless spectrum. According to a common illustration, the spectrum allocated for wide area network cellular communication oftentimes is not uniformly utilized across time and space; thus, a significant subset of spectrum may be unused in a given geographic location or in a given time interval.

According to another example, wireless communication systems oftentimes employ peer-to-peer or ad hoc architectures whereby a wireless terminal may transfer signals directly to another wireless terminal. As such, signals need not traverse through a base station; rather, wireless terminals within range of each other may communicate directly. However, conventional peer-to-peer networks typically operate in an asynchronous manner whereby peers may effectuate differing tasks at a particular time. Consequently, peers may encounter difficulty associated with paging disparate peers within range to initiate direct communication, power may be inefficiently utilized in such asynchronous environments, and so forth.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating paging of a peer in a peer-to-peer communication network. Paging messages may be communicated directly between a wireless terminal and its peer(s). Further, the wireless terminal may monitor for incoming paging messages during subinterval(s) of a paging interval as a function of an identifier of the wireless terminal. Moreover, the wireless terminal may transmit a paging message to a peer (e.g., detected and/or identified during peer discovery) during subinterval(s) of the paging interval as a function of an identifier of the peer.

According to related aspects, a method of operating a first wireless terminal for communicating paging messages directly with a second wireless terminal in a peer-to-peer network is described herein. The method may include obtaining a reference signal from a signal source. Further, the method may comprise determining a reference time instant from the obtained reference signal. Also, the method may include deriving starting time instants of a sequence of paging intervals as a function of the reference time instant. Moreover, the method may include monitoring during the sequence of paging intervals for a paging message directly sent by a peer.

Another aspect relates to a wireless communications apparatus. The wireless communications apparatus may include a memory that retains instructions related to obtaining a reference signal from a signal source, determining a reference time instant from the reference signal, deriving starting time instants of a sequence of paging intervals as a function of the reference time instant, and monitoring during the sequence of paging intervals for a paging message directly sent by a peer. Moreover, the wireless communications apparatus may include a processor, coupled to the memory, configured to execute the instructions retained in the memory.

Yet another aspect relates to a wireless communications apparatus that enables communicating paging messages directly with a peer in a peer-to-peer network. The wireless communications apparatus may include means for obtaining a reference signal from a signal source; means for determining a reference time instant from the obtained reference signal; means for deriving starting time instants of a sequence of paging intervals as a function of the reference time instant; and means for monitoring during the sequence of paging intervals for a paging message directly sent by a peer.

Still another aspect relates to a machine-readable medium having stored thereon machine-executable instructions for obtaining a reference signal from a signal source, determining a reference time instant from the obtained reference signal, deriving starting time instants of a sequence of paging intervals as a function of the reference time instant, and monitoring during the sequence of paging intervals for a paging message directly sent by a peer.

In accordance with another aspect, an apparatus in a wireless communication system may include a processor, wherein the processor may be configured to obtain a reference signal from a signal source. Additionally, the processor may be configured to determine a reference time instant from the obtained reference signal. Further, the processor may be configured to derive starting time instants of a sequence of paging intervals as a function of the reference time instant. Moreover, the processor may be configured to monitor during the sequence of paging intervals for a paging message directly sent by a peer.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
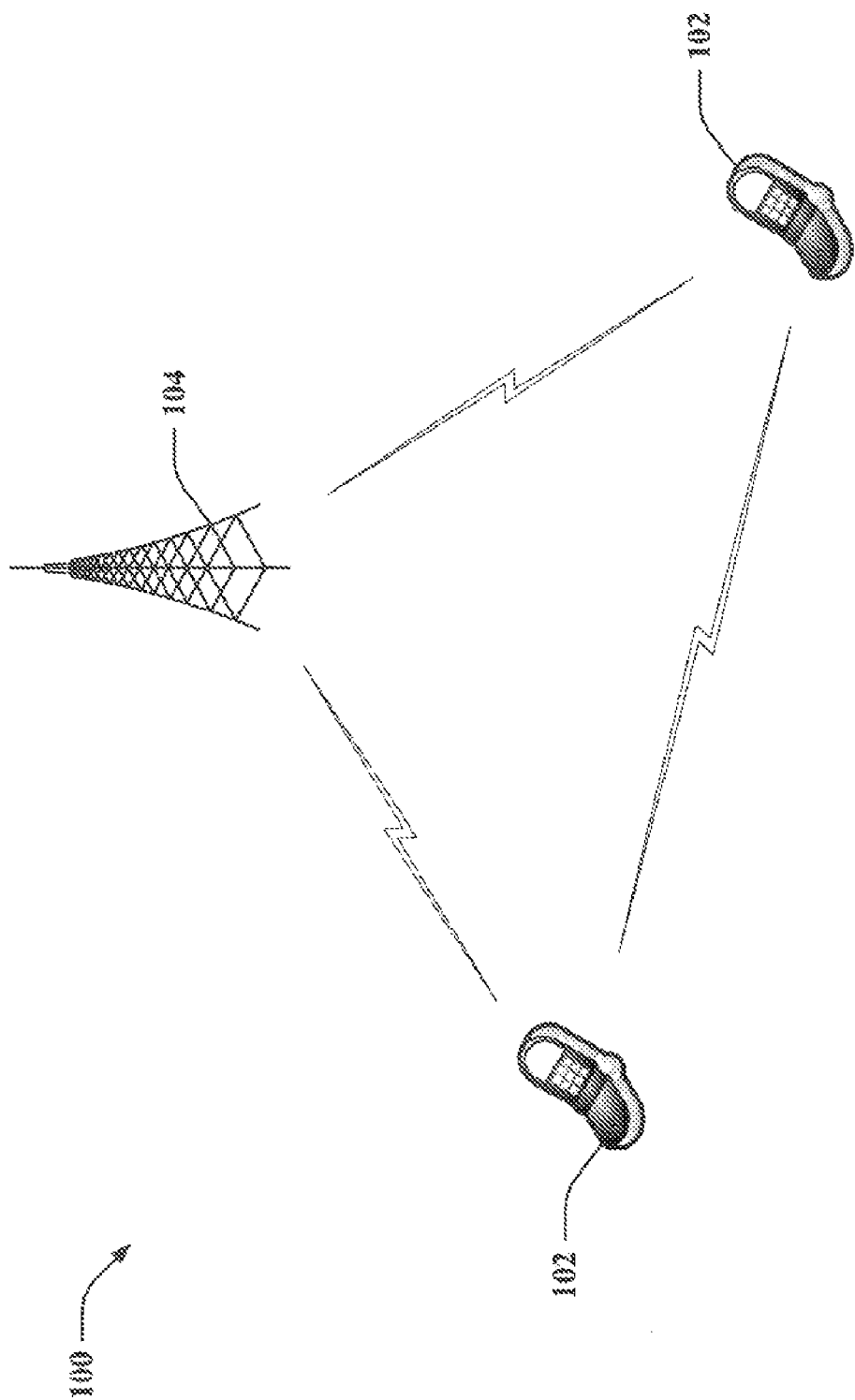
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a wireless terminal. A wireless terminal can also be called a system, subscriber unit, subscriber station, mobile station, mobile, mobile device, remote station, remote terminal, access terminal, user terminal, terminal, wireless communication device, user agent, user device, or user equipment (UE). A wireless terminal may be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station may be utilized for communicating with wireless terminal(s) and may also be referred to as an access point, Node B, or some other terminology.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 may comprise one or more wireless terminals 102. Although two wireless terminals 102 are depicted, it is to be appreciated that system 100 may include substantially any number of wireless terminals 102. Wireless terminals 102 can be, for example, cellular phones, smart phones, laptops, handheld communication devices, handheld computing devices, satellite radios, global positioning systems, PDAs, and/or any other suitable device for communicating over wireless communication system 100. Wireless terminals 102 can communicate directly with each other via a local area peer-to-peer (P2P) network (e.g., ad hoc network). Peer-to-peer communication may be effectuated by directly transferring signals between wireless terminals 102; thus, the signals need not traverse through a base station (e.g., base station 104). The peer-to-peer network may provide short range, high data rate communication (e.g., within a home, office, etc. type setting).

Further, system 100 may support a wide area network (WAN) (e.g., a cellular WAN system). System 100 may include a base station 104 (e.g., access point) and/or any number of disparate base stations (not shown) in one or more sectors that receive, transmit, repeat, etc. wireless communication signals to each other and/or to one or more wireless terminals 102. Base station 104 can comprise a transmitter chain and a receiver chain, each of which can in turn comprise a plurality of components associated with signal transmission and reception (e.g., processors, modulators, multiplexers, demodulators, demultiplexers, antennas, . . . ) as will be appreciated by one skilled in the art. Wireless terminal(s) 102 may transmit signals to and/or receive signals from base station 104 when communicating via the wide area infrastructure network supported by system 100.

Peer-to-peer communication between wireless terminals 102 may be synchronous. For example, wireless terminals 102 may utilize a common clock reference to synchronize performance of distinct functions. Wireless terminals 102 may obtain timing signals from base station 104 (and/or a transmitter (not shown) that provides less functionality) utilized to synchronize operation of wireless terminals 102. Wireless terminal 102 may obtain timing signals from other sources, such as GPS satellites. According to an illustration, time may be meaningfully partitioned in a peer-to-peer network for functions such as peer discovery, paging, and traffic. Further, it is contemplated that each peer-to-peer network may set its own time.

Before communication in a peer-to-peer network may take place, wireless terminals 102 (e.g., peers) may detect and identify each other. The process by which this mutual detection and identification between peers takes place may be referred to as peer discovery. After wireless terminals 102 discover their respective peer(s) within vicinity, active peer-to-peer connections may be established by such wireless terminals 102 with their peers detected and identified through peer discovery. For example, a wireless terminal (e.g., one of wireless terminals 102) may desire to communicate with a discovered peer (e.g., another one of wireless terminals 102). Accordingly, the wireless terminal may directly send a paging message to such peer during a paging interval, and the paging message may enable the wireless terminal and the peer to directly communicate during a traffic interval. System 100 may support a protocol that allows wireless terminal 102 to page the peer directly without transferring a paging message through an infrastructure base station (e.g., base station 104). According to another example, wireless terminal 102 may send (e.g., directly transmit) a paging message to a first peer with instructions to route the paging message (or a second paging message related to the paging message) to a second peer. Thereafter, the first peer may forward (e.g., directly transmit) the paging message to a second peer; thus, wireless terminal 102 may indirectly page the second peer through a series of direct peer-to-peer pages (e.g., via a multihop connection).

Transmissions of paging messages may periodically occur during specified times referred to as paging intervals, the timing of which may be predetermined by a protocol and known to wireless terminals 102. Peers may be synchronized to a common clock reference. For example, wireless terminals 102 may receive a broadcast signal and/or decode a small amount of broadcast information from locally positioned base station 104. Synchronization may allow for peers in a given geographic location to recognize a start and a finish of each paging interval (e.g., as well as a start and a finish of each peer discovery interval and/or traffic interval). Additionally, timing within an interval (e.g., symbol timing of the symbols within a paging, peer discovery, or traffic interval) may be obtained by way of the synchronization.

The local area peer-to-peer network and the wide area network may share a common wireless spectrum to effectuate communication; thus, bandwidth may be shared for transferring data via the disparate types of networks. For example, the peer-to-peer network and the wide area network may both communicate over the licensed spectrum. However, the peer-to-peer communication need not utilize the wide area network infrastructure.

Figure 2:
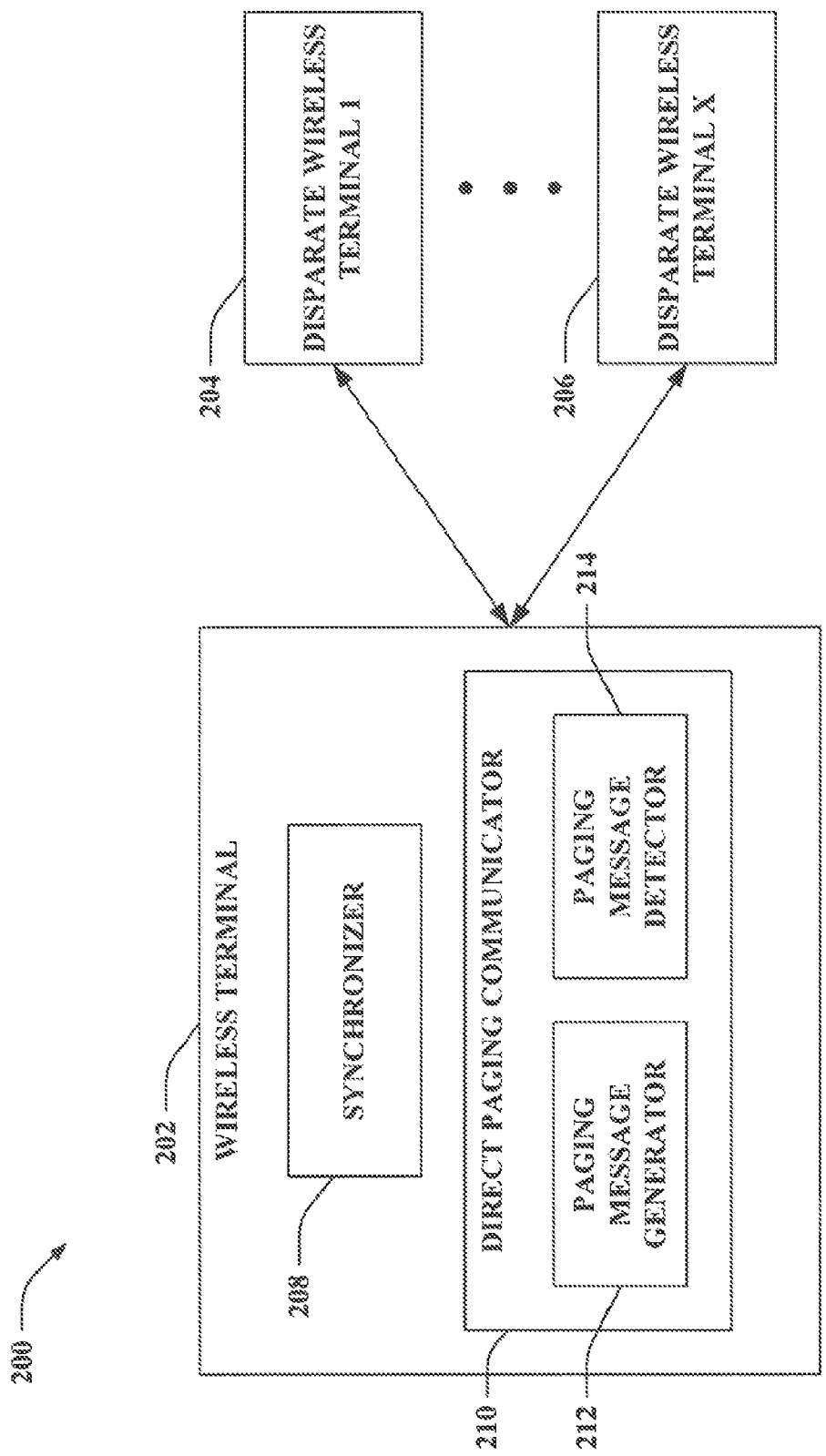
FIG. 2 is an illustration of an example system that synchronizes communication between wireless terminals in a peer-to-peer network for direct peer-to-peer paging.

Now turning to FIG. 2, illustrated is a system 200 that synchronizes communication between wireless terminals in a peer-to-peer network for direct peer-to-peer paging. System 200 includes a wireless terminal 202 that may communicate directly with substantially any number of disparate wireless terminals (e.g., disparate wireless terminal 1 204, . . . , disparate wireless terminal X 206, where X may be any integer). Although the following provides further detail with regards to wireless terminal 202, it is to be appreciated that such illustrations may similarly apply to disparate wireless terminals 204-206. Moreover, even though the below describes direct communication between two peers (e.g., wireless terminals 202-206), it is to be appreciated a series of direct peer-to-peer pages may be linked together to enable indirect paging by communicating a paging message through at least one intermediary peer.

Wireless terminal 202 may further include a synchronizer 208 that conforms timing between wireless terminal 202 and disparate wireless terminals 204-206. Synchronizer 208 may obtain its timing from a common clock reference. Similar synchronizers (not shown) of disparate wireless terminals 204-206 may obtain their respective timing from the same common clock reference. Further, synchronizer 208 may utilize a predetermined protocol to evaluate the common clock reference to identify a type of function to be effectuated at the time associated with the common clock reference (e.g., current time). Thus, for example, synchronizer 208 and similar synchronizers (not shown) of disparate wireless terminals 204-206 may determine that a time period identified from the common clock reference may be employed for one of peer discovery, paging, or traffic. The time period identified will be substantially the same or similar for synchronizer 208 and similar synchronizers (not shown) of disparate wireless terminals 204-206, even though wireless terminals 202-206 have not directly communicated with each other.

The common clock reference utilized by synchronizer 208 may be broadcast information (e.g., broadcast signal) from a base station (not shown) in a vicinity of wireless terminal 202 and disparate wireless terminals 204-206. Another common clock reference may include GPS satellite signals. For example, the broadcast information may be a Beacon, a PN (pseudo random) sequence signal, a pilot signal or other broadcast signal. Further, the broadcast signal may be periodically received from the base station. Moreover, timing information may be determined from the broadcast signal by synchronizer 208. By way of illustration, wireless terminal 202 and disparate wireless terminals 204-206 may receive and synchronize to the same broadcast signal, and therefore, have a common understanding of time. The common notion of time may be utilized to partition a timeline into distinct periods for each type of function (e.g., peer discovery, paging, traffic) according to a predetermined pattern defined by the air interface protocol.

Additionally, wireless terminal 202 may include a direct paging communicator 210 that effectuates direct peer-to-peer paging during a paging interval as determined by synchronizer 208. For example, wireless terminal 202 may discover that disparate wireless terminals 204-206 are within communication range (e.g., during peer discovery). Wireless terminal 202, for instance, may obtain identifiers (e.g., peer-to-peer communication identifiers) corresponding to discovered disparate wireless terminals 204-206 during peer discovery; however, it is to be appreciated that the identifiers may be obtained by wireless terminal 202 at any time and by any manner. Thereafter, wireless terminal 202 may decide to establish an active peer-to-peer connection with a particular discovered peer (e.g., disparate wireless terminal 1 204). Establishment of this connection can be effectuated by wireless terminal 202 employing direct paging communicator 210 to directly transmit a paging message to disparate wireless terminal 1 204 (or any other discovered peer); in response to the direct paging message, wireless terminal 202 and disparate wireless terminal 1 204 may enter into an active state whereby they may communicate traffic directly between one another (e.g., during a traffic interval). Pursuant to another example, disparate wireless terminal X 206 may desire to establish an active peer-to-peer connection with wireless terminal 202; accordingly, direct paging communicator 210 can listen for a paging message sent by disparate wireless terminal X 206 to wireless terminal 202.

Direct paging communicator 210 may further comprise a paging message generator 212 and a paging message detector 214. Paging message generator 212 may form a paging message intended for and/or transmit the paging message to one of the disparate wireless terminals 204-206 during a first portion of a paging interval as determined by synchronizer 208. Further, paging message detector 214 can monitor whether a paging message is received from one or more of disparate wireless terminals 204-206 during a second portion of the paging interval identified by synchronizer 208 and/or evaluate contents of such paging message. According to an example, the first and second portions of the paging interval may not overlap in time; thus, wireless terminal 202 may provide half duplex communication where transmission and reception of paging messages occur during differing times. Wireless terminal 202 can listen for incoming paging messages from disparate wireless terminals 204-206 with paging message detector 214 for a small portion of an overall time of a paging interval, while paging message(s) can potentially be transmitted by paging message generator 212 during the remainder of the overall time of the paging interval (e.g., at time(s) that are function(s) of identifier(s) uniquely corresponding to disparate wireless terminal(s) 204-206 for which paging message(s) are intended).

By way of illustration, wireless terminal 202 may enter into a peer-to-peer network that includes disparate wireless terminals 204-206. Upon entering the network, synchronizer 208 may determine timing associated with peer-to-peer communications (e.g., based upon a received common clock reference). Further, at a time partitioned for peer discovery, wireless terminal 202 may detect and/or identify disparate wireless terminals 204-206 as being within a vicinity of wireless terminal 202. If wireless terminal 202 desires to initiate an active peer-to-peer communication with disparate wireless terminal 1 204, paging message generator 212 may identify a portion of a paging interval during which disparate wireless terminal 1 204 may monitor for incoming paging messages. According to an example, such portion of the paging interval may be a function of an identifier (e.g., peer-to-peer communication identifier) of disparate wireless terminal 1 204; the identifier may map, hash, etc. to subinterval(s) within the paging interval. Moreover, the portion of the paging interval may be small in comparison to an overall time of the paging interval and/or may vary between differing paging intervals. During the portion of the paging interval, paging message generator 212 may transmit a paging message to disparate wireless terminal 1 204. The paging message may include an identifier of a paged peer (e.g., identifier of disparate wireless terminal 1 204), an identifier of a paging peer (e.g., identifier of wireless terminal 202), a MAC ID, quality of service (QoS) information, information pertaining to a type of communication (e.g., voice, data, gaming, . . . ) a portion of an identifier, a combination thereof, and the like. For example, the paging message may include a paging identifier corresponding to the paged peer (e.g., disparate wireless terminal 1 204), where the paging identifier may be a portion of a peer-to-peer communication identifier of the paged peer. Based upon the transmitted paging message, wireless terminal 202 and disparate wireless terminal 1 204 may establish an active peer-to-peer connection (e.g., during a traffic interval).

In accordance with another example, paging message detector 214 may monitor for incoming paging messages transferred by a peer (e.g., disparate wireless terminal X 206). Paging message detector 214 may listen during a portion of a paging interval, where the portion may be a function of an identifier (e.g., peer-to-peer communication identifier) of wireless terminal 202. Paging message detector 214 may allow wireless terminal 202 to monitor for paging messages during subinterval(s) that may be similar or different from subinterval(s) monitored by disparate wireless terminals 204-206 during a particular paging interval; however, if similar subinterval(s) are monitored by more than one peer during a particular paging interval, differing subinterval(s) may be monitored during a disparate paging interval. The time varying nature of the monitored subinterval(s) enables each peer to page and/or be paged by each peer even though collisions may occasionally occur during a particular paging interval. Paging message detector 214, for instance, may receive a paging message during the monitored portion of the paging interval, and thereafter establish an active peer-to-peer connection. According to another illustration, paging message detector 214 may monitor the portion yet not receive a paging message, and hence, wireless terminal 202 may transition to a sleep state during a corresponding traffic interval.

A set of fixed and predetermined time intervals may be dedicated for the purpose of direct peer-to-peer paging. For example, wireless terminal 202 may select a subset of the time intervals to monitor its peer-to-peer paging with paging message detector 214 as a function of a peer-to-peer communication identifier corresponding to wireless terminal 202. A typical duty cycle of the time intervals to be monitored by paging message detector 214 may be around 1 second. Moreover, paging message detector 214 of wireless terminal 202 monitors a small number of symbols in a time interval. Those symbols may be contiguous in time. For example, the number of symbols can be less than 8. The symbols may carry a time-varying paging identifier, which may be uniquely derived from the peer-to-peer communication identifier of wireless terminal 202. If paging message detector 214 of wireless terminal 202 detects that its paging identifier has been transmitted in the time interval, wireless terminal 202 considers itself to have been paged. Otherwise, wireless terminal 202 may transition to a power saving mode (e.g., during a traffic interval).

In another example, paging message generator 212 may form a paging message intended for and/or transmit the paging message to one of the disparate wireless terminals 204-206 during a first paging interval as determined by synchronizer 208. Further, paging message detector 214 can monitor whether a paging message is received from one or more of disparate wireless terminals 204-206 during a second paging interval identified by synchronizer 208 and/or evaluate contents of such paging message. According to an example, the first and second paging intervals may not overlap in time. This example differs from the previous example as the time interval for monitoring or transmitting a paging message is substantially an entire paging interval instead of a portion of a paging interval. In one embodiment, paging message detector 214 can monitor all the paging intervals, except for the paging intervals in which paging message generator 212 intends to transmit paging messages to other wireless terminals. In another embodiment, paging message detector 214 can monitor a subset of the paging intervals as a function of an identifier (e.g., peer-to-peer communication identifier) of wireless terminal 202. The function may be time-varying. Furthermore, when paging message generator 212 intends to transmit a paging message to disparate wireless terminal 1 204, paging message generator 212 may identify a paging interval during which disparate wireless terminal 1 204 may monitor for incoming paging messages. The paging interval may be a function of an identifier (e.g., peer-to-peer communication identifier) of disparate wireless terminal 1 204. The function may be time-varying.

Figure 3:
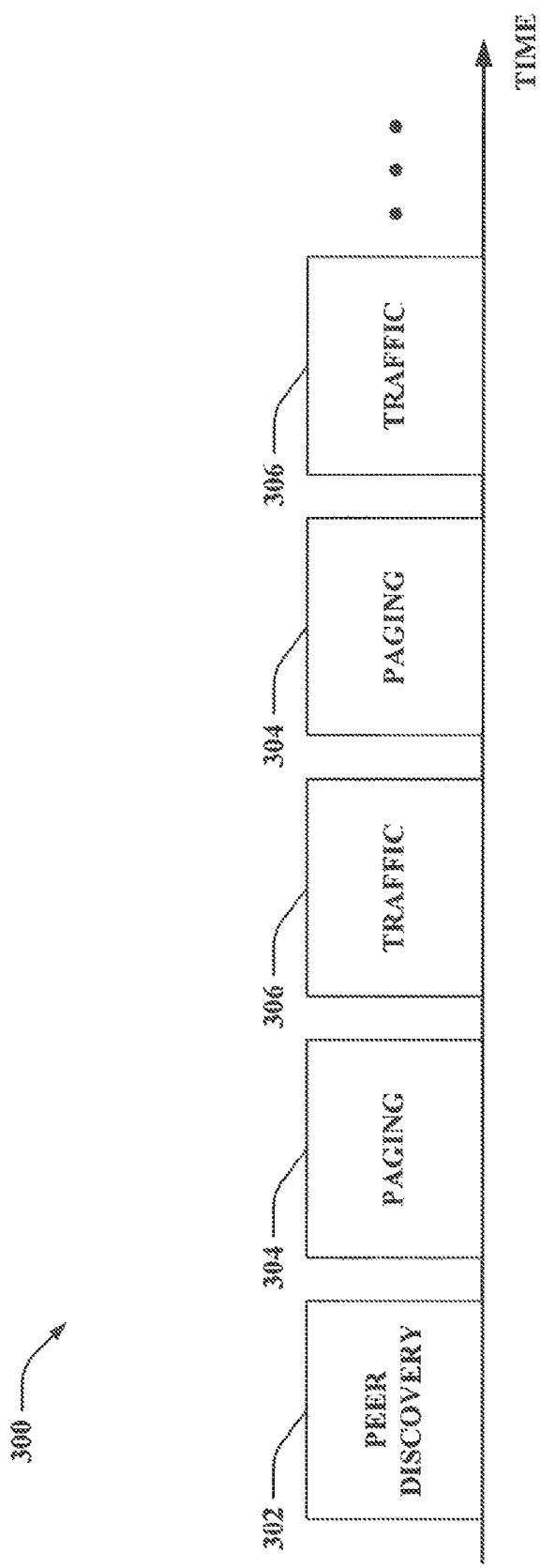
FIG. 3 is an illustration of an example timing diagram utilized by synchronized peers communicating within a peer-to-peer environment.

Referring to FIG. 3, illustrated is an example timing diagram 300 utilized by synchronized peers communicating within a peer-to-peer environment. Timing diagram 300 may be partitioned with intervals for peer discovery 302, paging 304, and traffic 306. As noted above, peers may be synchronized with one another based upon a common clock reference; thus, the peers may have a common notion of timing diagram 300.

Peer discovery intervals 302 may be dedicated for detecting and identifying peers. Further, any number of paging intervals 304 and/or traffic intervals 306 may be included between adjacent peer discovery intervals 302. Any number of traffic intervals 306 may be included between adjacent paging intervals 304. During paging intervals 304, a wireless terminal may directly send a paging message to and/or listen for a paging message from a peer; accordingly, in response to the communicated paging message, the wireless terminal and the peer can enter into an active state and directly communicate during a traffic interval 306. Further, the wireless terminal may transition to a sleep mode (e.g., for power saving) during traffic intervals 306 when the wireless terminal does not send or receive a paging message during corresponding paging intervals 304.

Figure 4:
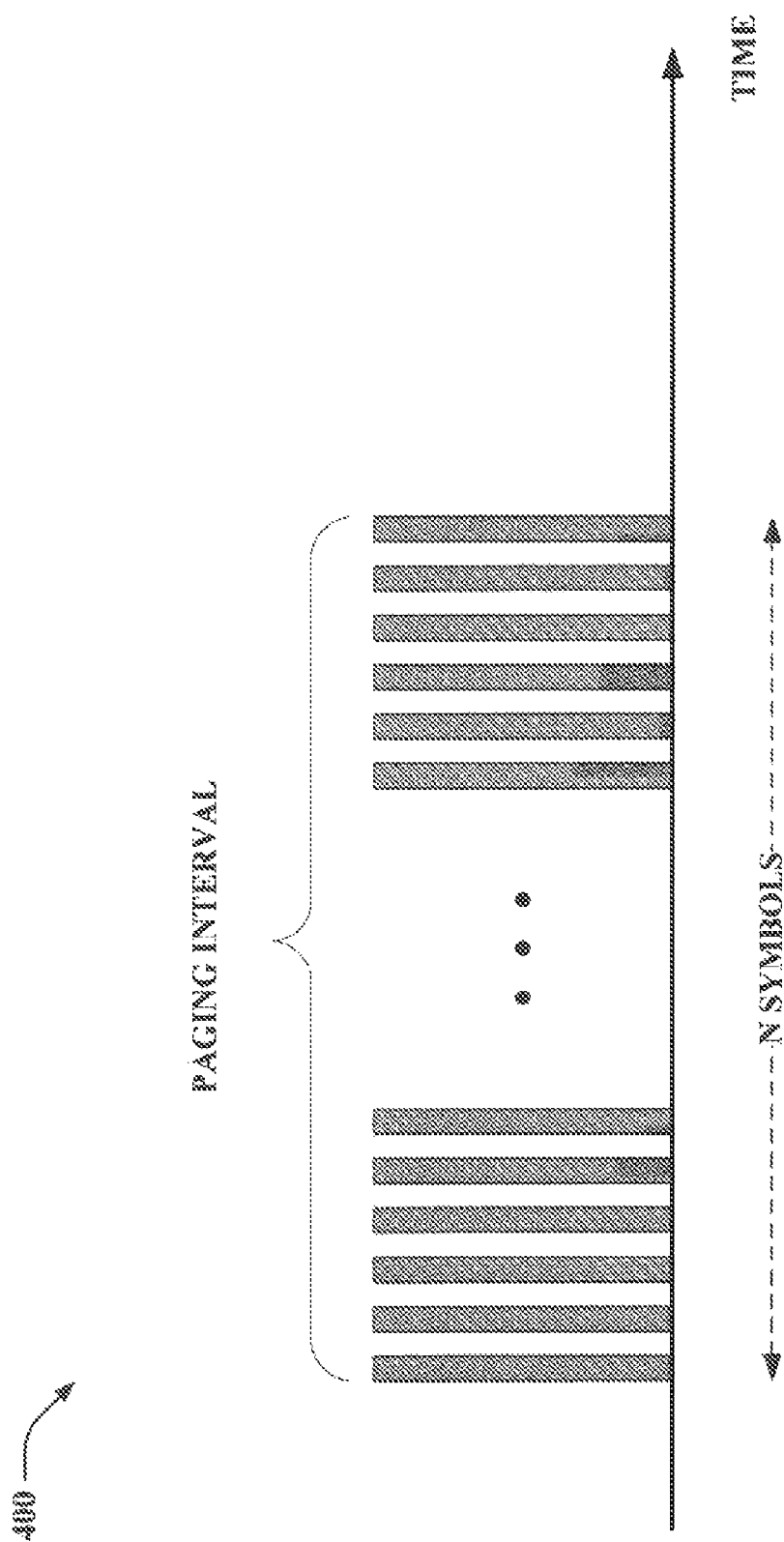
FIG. 4 is an illustration of an example timing diagram of a paging interval.

With reference to FIG. 4, illustrated is an example timing diagram 400 of a paging interval. The paging interval may include a set of subintervals. For example, a subinterval may include one symbol. A paging interval may include N symbols such as OFDM symbols, where N may be any integer. Each peer within a peer-to-peer network may monitor a small portion of the set of subintervals (e.g., one or more of the symbols) within the paging interval to listen for paging messages sent to the peer from a disparate peer. For example, the one or more subintervals to be monitored by a particular wireless terminal may be a function of an identifier of the particular wireless terminal. Further, the monitored subinterval(s) may also be a function of time (e.g., time varying); thus, different subinterval(s) may be monitored during differing paging intervals by the corresponding wireless terminal.

Moreover, the remaining subintervals may be utilized by the particular wireless terminal to transmit paging messages to peer(s) since peer-to-peer communication may employ a half-duplex mode where a wireless terminal either transmits or receives data at a particular time. For instance, the particular wireless terminal may identify subinterval(s) to be monitored by a peer with which direct peer-to-peer communication is desired. The subinterval(s) may be determined as a function (e.g., hash, map, . . . ) of an identifier of the peer and/or time. Thus, the wireless terminal may transmit the paging message during the determined subinterval(s).

Suppose that the wireless terminal may intend to page a peer in a paging interval. It is possible that, in that paging interval, the subinterval to be monitored by the wireless terminal and the subinterval to be monitored by the peer substantially overlap with each other. In a first example, the wireless terminal treats transmitting the paging message as a higher priority task. That is, the wireless terminal may always decide to transmit the paging message in that paging interval, in which case the wireless terminal may not be able to monitor the entire subinterval that the wireless terminal is supposed to monitor. As a result, the wireless terminal may miss some potential incoming paging messages from other peers. In a second example, the wireless terminal treats monitoring paging messages as a higher priority task. That is, the wireless terminal may decide not to transmit the paging message in that paging interval so that the wireless terminal can monitor the subinterval for potential incoming paging messages from other peers. The wireless terminal may select another paging interval, (e.g., a subsequent paging interval) in which the subinterval to be monitored by the wireless terminal and the subinterval to be monitored by the peer does not substantially overlap with each other. The wireless terminal may transmit the paging message in that paging interval. As a result, the transmission of the paging message to the peer is delayed. In a third example, the wireless terminal evaluates the relative importance of monitoring paging messages from other peers and transmitting the paging message to the peer, and then decides whether to treat transmitting the paging message as a higher priority task or treat monitoring paging messages as a higher priority task. For example, the importance of monitoring paging messages may be high if an important paging message is anticipated to arrive (e.g., with reasonably high probability). The importance of transmitting the paging message may be high if the QoS priority associated with the connection to be set up by the paging message is high. Moreover, the importance of transmitting the paging message may increase when the paging message has been delayed to transmit for some time.

In accordance with an illustration, the wireless terminal may determine the transmission time(s) and/or listening time(s) based upon an identifier and/or a notion of time (e.g., derived from a received Beacon). In essence a time-varying variable can be derived from the notion of time. All the wireless terminals may get the same notion of time. For example, the wireless terminals may obtain a time-varying variable from the broadcast (e.g., beacon) signal from the base station. The time-varying variable can be some variable transmitted in the broadcast signal. For example, the variable can be some time counter or system time, which varies over time. In this document, the notion of time is referred to as time counter. It is desired that the time counter varies from one paging interval to another. By way of further example, the wireless terminal may utilize a pseudo-random number generator, whose seed can be an identifier of the wireless terminal and a current counter value supplied by a broadcast signal from a base station, to select transmission time(s) and/or listening time(s). As the time counter varies, the selected transmission time(s) and/or listening time(s) may also vary from one paging interval to another.

Figure 5:
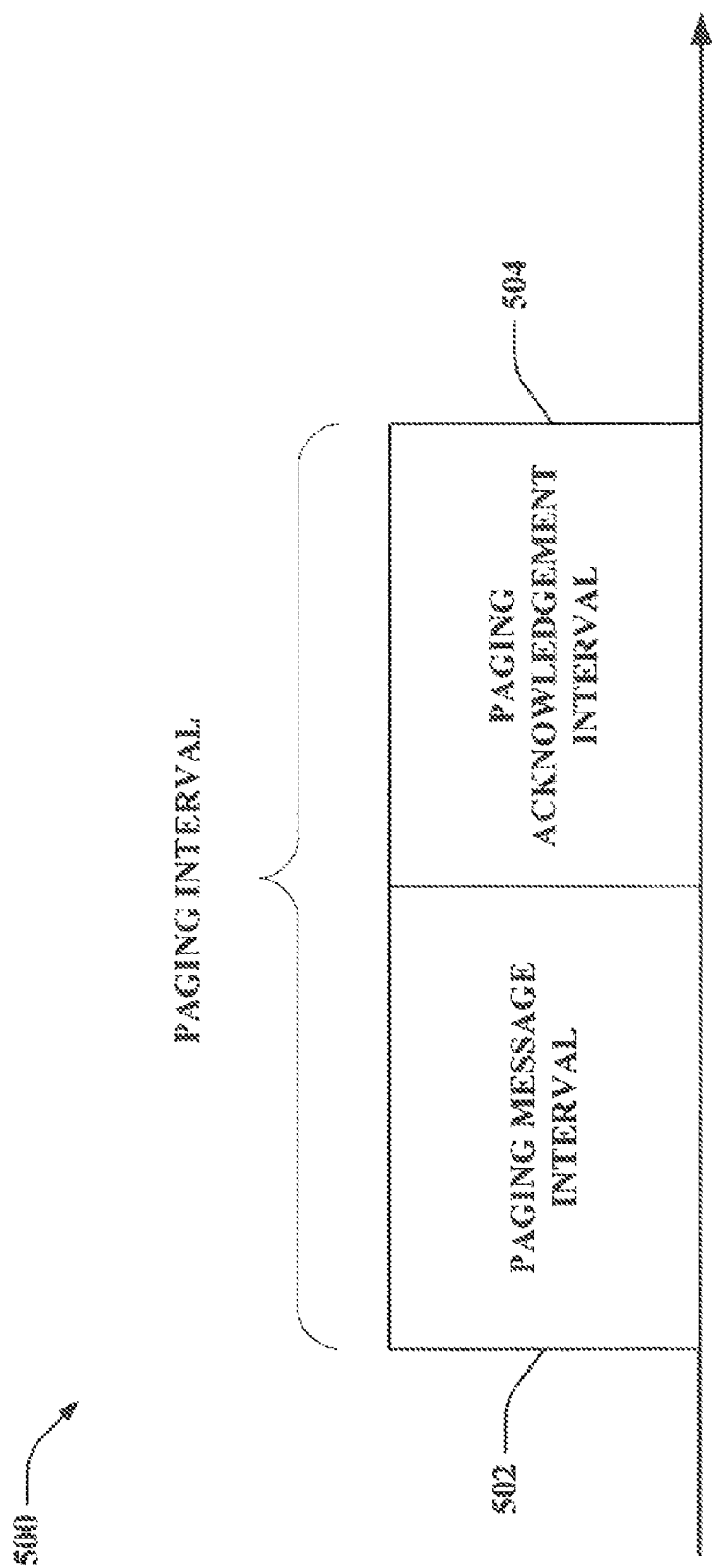
FIG. 5 is an illustration of an example timing diagram of another paging interval.

Referring now to FIG. 5, illustrated is an example timing diagram 500 of another paging interval. As depicted, the paging interval may include two segments: namely, a paging message interval 502 and a paging acknowledgment interval 504. Paging message interval 502 may include any number of subintervals similar to timing diagram 400 of FIG. 4. Likewise, each peer within a peer-to-peer environment may monitor a time varying subset of the subintervals based upon respective identifiers. Moreover, paging acknowledgement interval 504 may enable a wireless terminal that considers itself to have been paged during paging message interval 502 to verify that it was indeed paged by a peer.

Multiple wireless terminals may monitor the same time subinterval(s) or the same number of symbols during paging message interval 502. In the case where a paging identifier is shorter than a peer-to-peer communication identifier, more than one wireless terminal may consider themselves to be paged, although one of them is actually paged. To further resolve this ambiguity, these wireless terminals may monitor additional paging information to be transmitted by a wireless terminal initiating the page (e.g., paging peer). The additional paging information may include additional bits of the identifier of the recipient wireless terminal (e.g., paged peer) as well as some bits of the identifier of the transmitting wireless terminal (e.g., paging peer). Further, the additional information may include a proposed MAC ID for direct communication during a peer-to-peer traffic mode, data related to traffic types (e.g., voice, data, gaming, . . . ), QoS level, etc.

According to an example, a dedicated paging message interval 502 may allow a paging peer to transmit a paging message (e.g., including a paging identifier) to an intended peer to be paged during subinterval(s) within paging message interval 502. After receiving the signal in the paging message interval 502, a peer monitoring such subinterval(s) may evaluate the paging message and determine it is not the intended recipient (e.g., by evaluating the paging identifier included therewith); thus, this peer may fall back to a power-saving mode. According to another example, another peer monitoring the common subinterval(s) may review the paging message and mistakenly believe it is the intended recipient during paging message interval 502; this peer may obtain the additional paging information during paging acknowledgement interval 504 and realize it is not the intended recipient. By way of further illustration, paging acknowledgement interval 504 corresponding to paging message interval 502 may allow the actual intended recipient to complete a paging handshaking procedure.

In another example (not shown), all wireless terminals in a peer-to-peer network may monitor data traffic bursts. Thus, a paging wireless terminal may transmit the additional paging information using at least one data traffic burst in subsequent time intervals (e.g., in a broadcast mode). The data traffic burst to be selected by the paging wireless terminal may not be predetermined. However, the paging wireless terminal may transmit the data traffic burst within a certain predetermined delay bound so that the other wireless terminals will fall back to the power saving mode if they have not seen their identifiers be sent within the delay bound. The data traffic burst may have its corresponding acknowledgment interval in which the paged wireless terminal can send an acknowledgement to complete the paging handshaking procedure.

Figure 6:
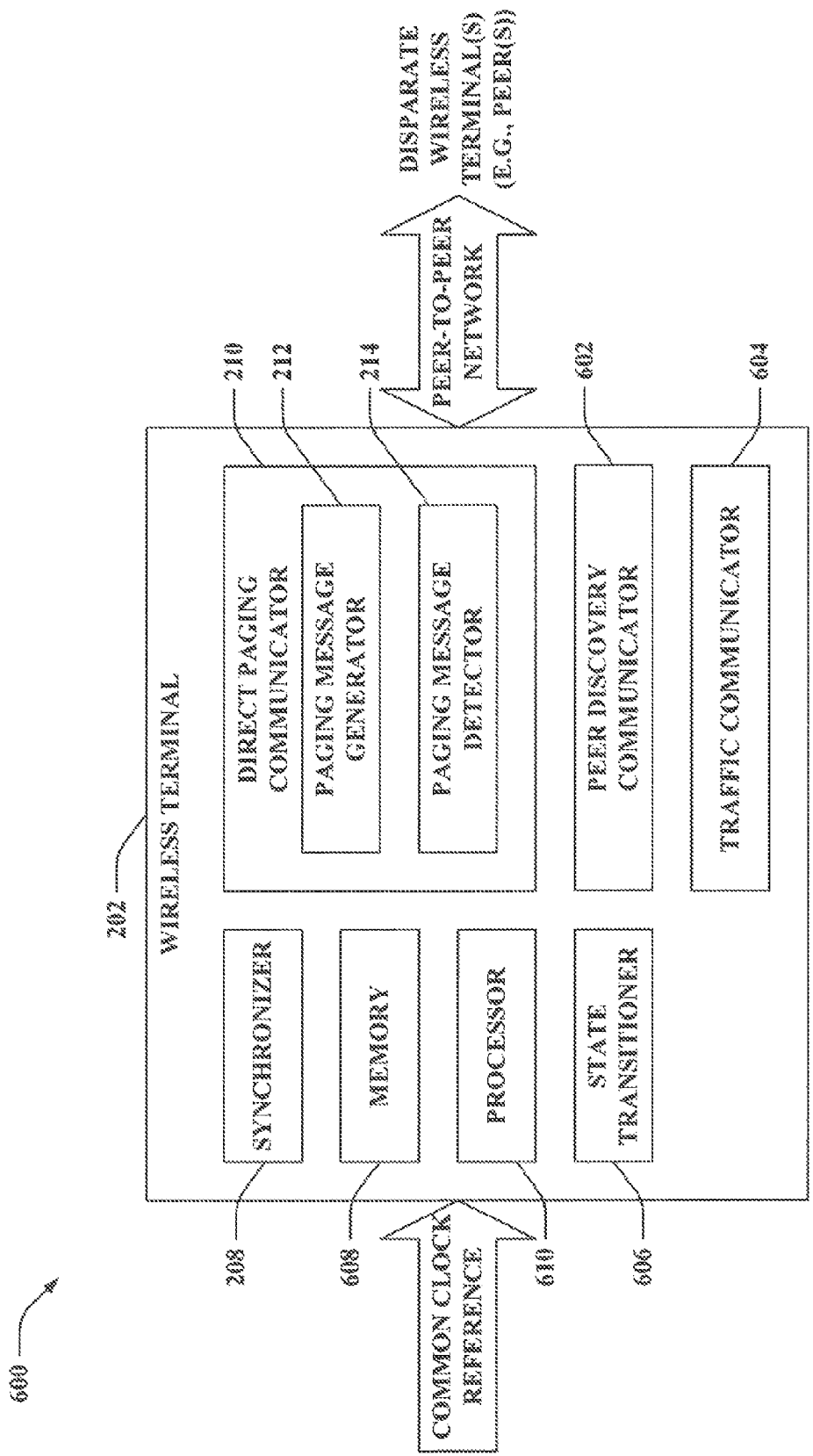
FIG. 6 is an illustration of an example system that effectuates direct peer-to-peer paging over a peer-to-peer network.

Referring now to FIG. 6, illustrated is a system 600 that effectuates direct peer-to-peer paging over a peer-to-peer network. System 600 includes wireless terminal 202 that may communicate via a peer-to-peer network with disparate wireless terminal(s) (e.g., peer(s)). Wireless terminal 202 may include synchronizer 208 that coordinates performance of various functions (e.g., peer discovery, paging, traffic). Synchronizer 208 may obtain and analyze a common clock reference to determine a meaningful notion of time. Additionally, the disparate wireless terminal(s) may obtain and analyze the common clock reference to yield the same notion of time; hence, peers within a local area may synchronize with the same common clock reference (e.g., from the same base station). Therefore, peers get the same timing (timing synchronized) without directly communicating with each other. For example, the common clock reference may be a Beacon signal transmitted by a base station within range of wireless terminal 202 and the peers. Further, wireless terminal 202 may comprise direct paging communicator 210, which further includes paging message generator 212 and paging message detector 214.

Wireless terminal 202 may also include a peer discovery communicator 602 and a traffic communicator 604. Based upon the synchronized notion of time yielded by synchronizer 208, peer discovery communicator 602 and traffic communicator 604 may transmit and/or receive signals via the peer-to-peer network during respective, allocated times for such functions. For example, peer discovery communicator 602 may enable detection and identification of peer(s) of wireless terminal 202. Further, peer discovery communicator 602 may transmit data that allows wireless terminal 202 to be detected and identified. Moreover, during an allocated traffic interval, wireless terminal 202 and a peer may transmit and/or receive traffic by employing traffic communicator 604.

Wireless terminal 202 may additionally include a state transitioner 606. To provide power savings, state transitioner 606 may enable wireless terminal 202 to enter a sleep state during time intervals associated with functions (e.g., traffic) when wireless terminal 202 is not involved with such functions. Further, state transitioner 606 switches wireless terminal 202 to an on state (e.g., from a sleep state) during peer discovery intervals to enable wireless terminal 202 to discover peer(s) and/or be discovered by peer(s). Moreover, state transitioner 606 switches wireless terminal 202 to an on state during a paging interval (or a portion thereof).

Moreover, wireless terminal 202 may include memory 608 and a processor 610. Memory 608 may retain an identifier associated with wireless terminal 202. Further, memory 608 may include identifiers corresponding to peers, which may be leveraged by direct paging communicator 210. Additionally, memory 608 may retain instructions related to synchronizing time intervals for differing functions with disparate wireless terminals, establishing a common period of time for paging in a local area (e.g., based upon information obtained from a base station), identifying subinterval(s) within a paging interval for transmitting and/or listening for paging messages, generating paging messages for transmission to disparate wireless terminals, detecting paging messages from peers, and so forth. Moreover, processor 610 may execute instructions described herein.

Figure 7:
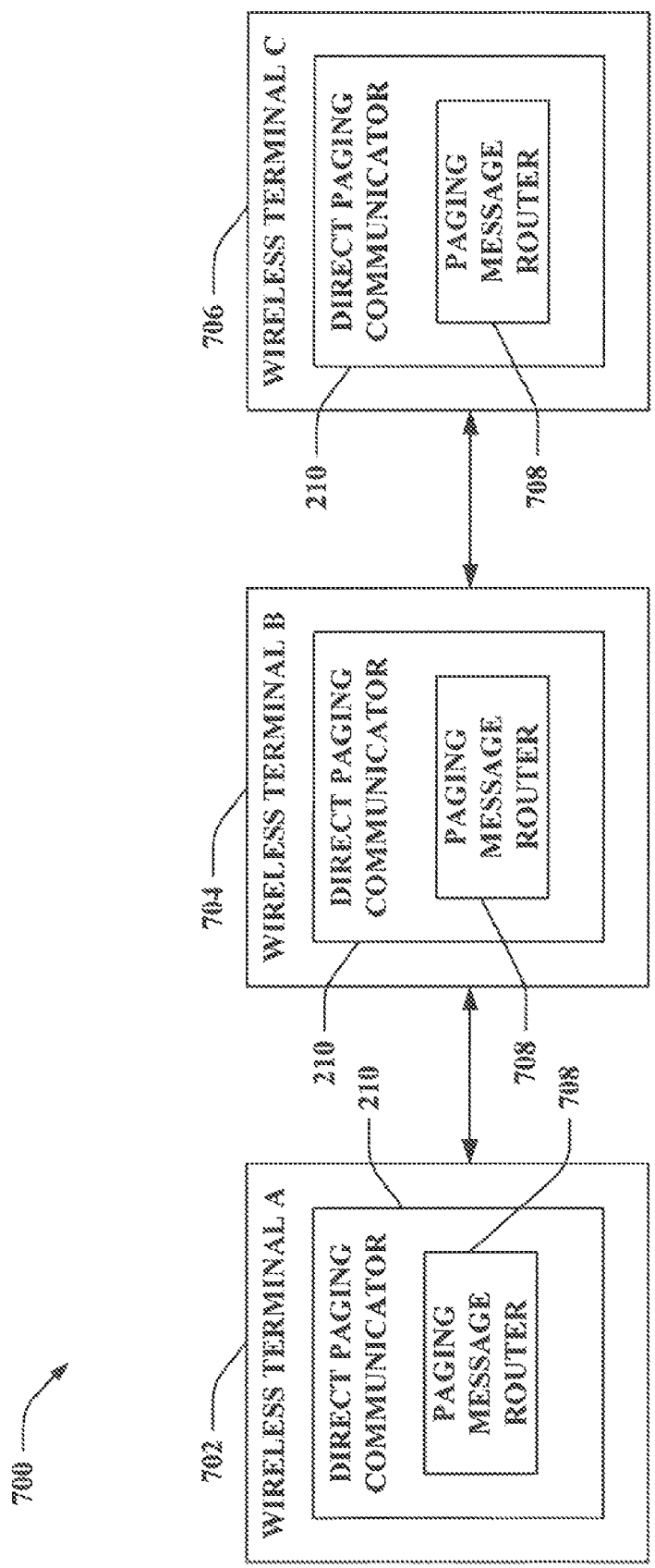
FIG. 7 is an illustration of an example system that enables multihop paging within a peer-to-peer environment.

With reference to FIG. 7, illustrated is a system 700 that enables multihop paging within a peer-to-peer environment. System 700 includes a wireless terminal A 702, a wireless terminal B 704, and a wireless terminal C 706; however, it is to be appreciated that substantially any number of wireless terminals similar to wireless terminals 702-706 may be included in system 700. Moreover, wireless terminals 702-706 may be substantially similar to wireless terminal 202 and/or disparate wireless terminals 204-206 described above in connection with FIG. 2. Wireless terminals 702-706 may each include a respective direct paging communicator 210. Moreover, each direct paging communicator 210 may further include a paging message router 708 that routes paging messages to enable indirect paging. Additionally, although not shown, direct paging communicators 210 may include paging message generators and/or paging message detectors as described above.

According to an example, wireless terminal A 702 may desire to communicate with wireless terminal C 706 by way of peer-to-peer connection(s). However, wireless terminal A 702 and wireless terminal C 706 may be positioned at too great a distance from one another such that peer-to-peer communication may not directly occur between such wireless terminals. Additionally or alternatively, wireless terminal A 702 may be unable to directly page wireless terminal C 706 or may select to not directly page wireless terminal C 706 for any disparate reason. Thus, wireless terminal A 702 (e.g., by employing paging message router 708) may pass a paging message to wireless terminal B 704 that provides information instructing wireless terminal B 704 to forward the paging message to wireless terminal C 706. Further, upon the paging message reaching its destination and wireless terminal A 702 being indirectly connected with wireless terminal C 706, traffic may be indirectly (or directly) routed between wireless terminal A 702 and wireless terminal C 706. For example, dynamic switching may be employed to select the route for the traffic. According to an illustration, traffic may be directly transferred between wireless terminal A 702 and wireless terminal C 706, transferred via wireless terminal B 704 or any other wireless terminal (not shown), etc. Moreover, traffic routing may change over time. Note that the traffic may be routed in a substantially similar way as the multi-hop paging message. Alternatively, the traffic may use a route different from the one used by the multi-hop paging message.

Paging message router 708 of wireless terminal A 702 may enable a paging message generator (not shown) to yield a paging message that includes an identifier of a peer that the paging message is to be directly sent to (e.g., identifier of wireless terminal B 704, intermediary peer) as well as additional routing information. Thus, paging message router 708 of wireless terminal B 704 may analyze the additional routing information included in the paging message and determine that the paging message is to be forwarded to wireless terminal C 706. The additional routing information, for example, may be an identifier of a peer to which the paging message is ultimately destined to be communicated (e.g., wireless terminal C 706) (and/or any disparate intermediary peer(s)).

Multihop paging may be effectuated by communicating a series of direct paging messages (e.g., wireless terminal A 702 paging wireless terminal B 704, wireless terminal B 704 paging wireless terminal C 706, . . . ). Thus, a series of direct pages may be employed to indirectly communicate paging related information. Moreover, direct paging utilized in the multihop scenario (e.g., each direct page between peers within the series of pages) may be substantially similar to the other examples of direct paging described herein.

Referring to FIGS. 8-12, methodologies relating to performing direct paging within a peer-to-peer network are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Figure 8:
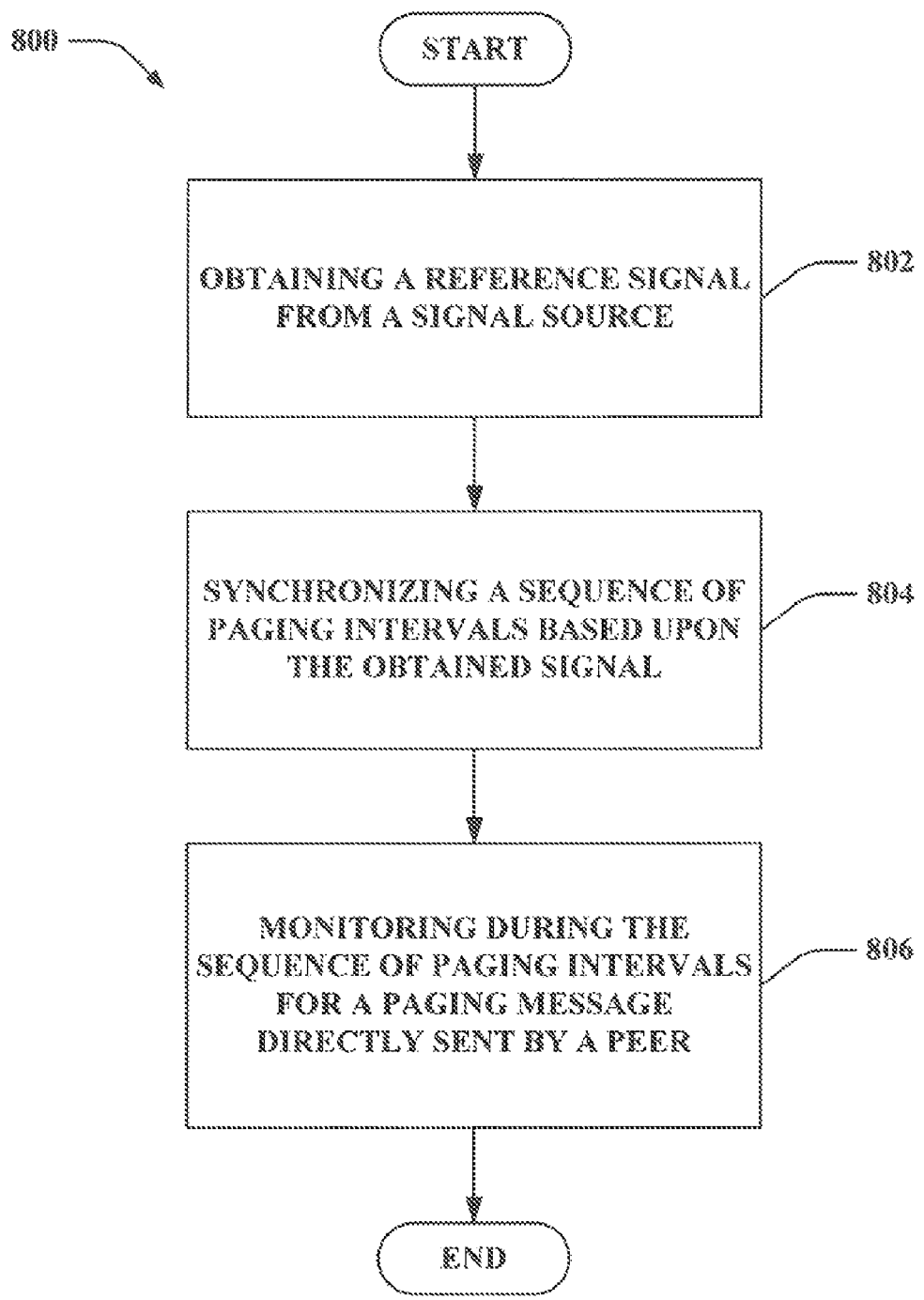
FIG. 8 is an illustration of an example methodology of operating a first wireless terminal for communicating paging messages directly with a second wireless terminal in a peer-to-peer network.

Turning to FIG. 8, illustrated is a methodology 800 of operating a first wireless terminal for communicating paging messages directly with a second wireless terminal in a peer-to-peer network. At 802, a reference signal may be received from a signal source (e.g., base station, an access node, a GPS satellite, . . . ). The signal may be broadcast by a base station in a vicinity of the peer-to-peer network; thus, the wireless terminal performing synchronization as well as other wireless terminals (e.g., that may similarly effectuate synchronization) in the peer-to-peer network may obtain a common signal from the same base station. Further, the signal may be a common clock reference. Pursuant to an example, the signal may be a Beacon, a PN (pseudo random) sequence signal, a pilot signal, etc. Moreover, the signal may be periodically received. At 804, a sequence of paging intervals (e.g., paging periods) may be synchronized based upon the obtained signal. For example, the time position of a reference time instant may be first derived from the obtained signal, and then the starting and/or ending times of a paging interval may be determined as some fixed time offsets from the reference time instant (e.g., starting time instants of a sequence of paging intervals may be derived as a function of the reference time instant). Note that the wireless terminal may obtain the signal in a periodical manner, and therefore continue estimating or adjusting the reference time instant. During the paging interval, the wireless terminal may receive paging messages from a peer and/or transmit paging messages to a peer. A starting time, ending time, timing within (e.g., subintervals) the paging interval may be coordinated within the peer-to-peer environment. At 806, the sequence of paging intervals may be monitored for a paging message directly sent by a peer. For instance, a subset of times during the paging intervals may be monitored as a function (e.g., hash, mapping, . . . ) of an identifier of the wireless terminal. Moreover, the subset of times may be time varying. By way of illustration, a first subset of times during a particular paging interval in the sequence of paging intervals can be determined as a function of the identifier of the wireless terminal, and the first subset of times can be monitored during the particular paging interval for a paging message directly sent by a peer. For instance, a time duration of the first subset of times can be less than 50% of a time duration of the particular paging interval. Moreover, monitoring can be restrained during at least a portion of the remaining times during the paging interval. By way of another example, a time variable can be determined from the obtained reference signal; the value of the time variable can vary between one paging interval and a subsequent paging interval. Following this example, the first subset of times can be determined as a function of the time variable of the paging interval.

If a paging message is transmitted by a peer during the subset of times, the wireless terminal may receive the paging message. Further, upon receipt, content of the obtained paging message may be evaluated (e.g., an identifier of the wireless terminal can be compared with at least a portion of the information bits received in the paging message). For example, identifier related information (e.g., pertaining to the paging peer, paged peer, MAC ID, an ultimate destination, . . . ) included in the paging message may be reviewed to determine whether the wireless terminal is the intended recipient of the paging message. Moreover, the information (e.g., related to MAC ID, QoS, type of traffic, . . . ) from the paging message may be employed to enable direct communication of traffic between the peer and the wireless terminal during a corresponding traffic interval.

According to another example, the subset of times during the paging interval (e.g., during a first segment of the paging interval) may be monitored for the paging message. If the wireless terminal obtains the paging message from a paging peer, the wireless terminal may receive additional information during a second segment of the paging interval utilized to determine whether the wireless terminal is the intended recipient of the paging message from the paging peer. The paging peer, for instance, may transmit more information (e.g., identifiers of paging and/or paged peers, proposed MAC ID for use during direct communication, . . . ) during the second segment as compared to the first segment of the paging interval; thus, ambiguity related to the intended recipient peer may be resolved. By way of another illustration, the additional information may be transmitted by way of a traffic broadcast (e.g., during a traffic interval) rather than during a second segment of the paging interval; thus, wireless terminals obtaining the paging message may utilize the broadcast information to deduce whether they are the intended recipients.

Figure 9:
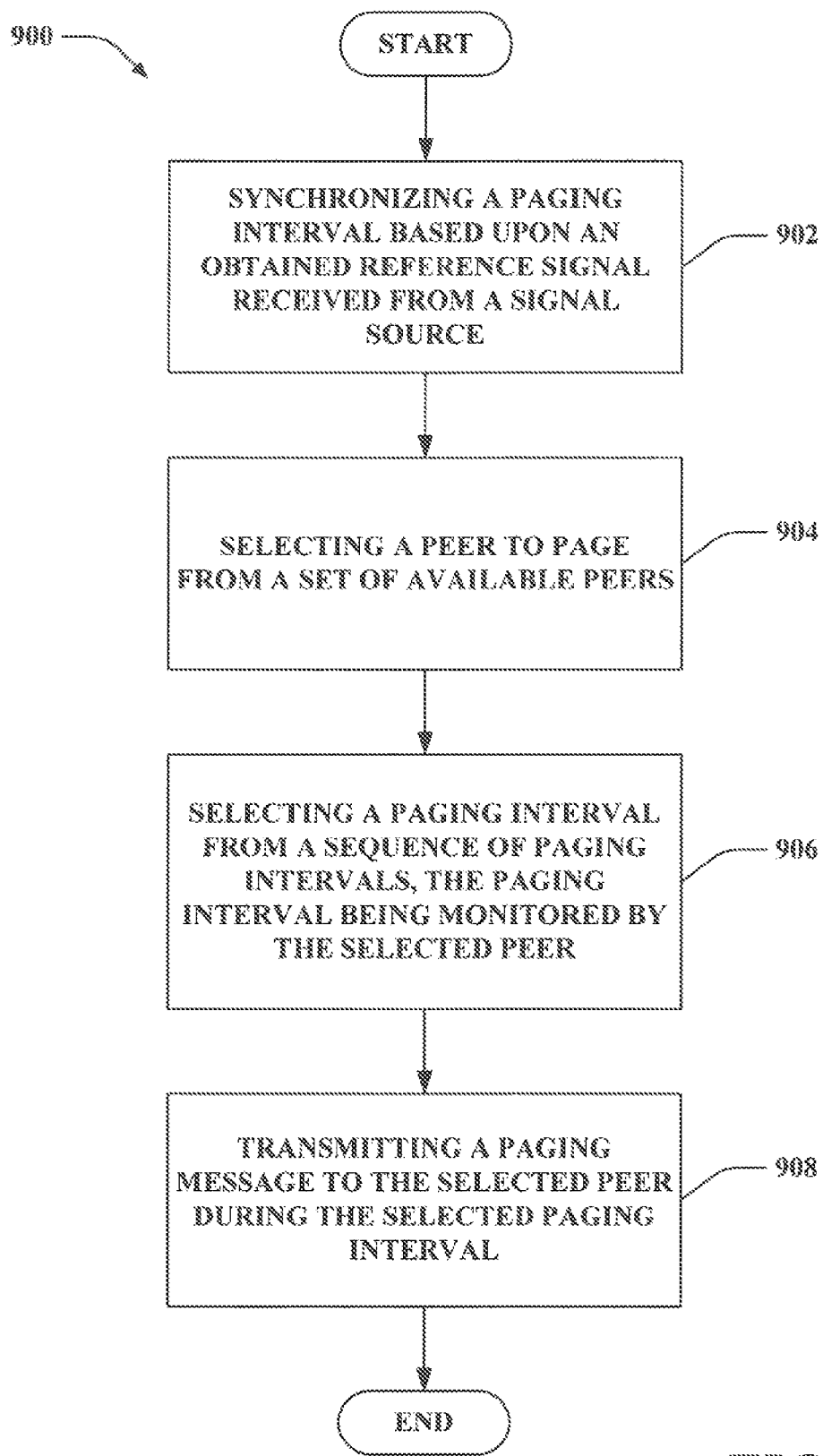
FIG. 9 is an illustration of an example methodology that facilitates directly sending paging messages in a peer-to-peer environment.

Turning to FIG. 9, illustrated is a methodology 900 that facilitates directly sending paging messages in a peer-to-peer environment. At 902, a paging interval may be synchronized based upon an obtained reference signal received from a signal source. A wireless terminal and its peers may have a common understanding of time, which enables synchronizing the paging interval. At 904, a peer may be selected to be paged from a set of available peers. For example, any number of peers within a vicinity of the wireless terminal may be detected and identified during a peer discovery interval, and a particular peer may be selected for establishing direct peer-to-peer communication with from these detected and identified peers. At 906, a paging interval from a sequence of paging intervals can be selected, where the paging interval is being monitored by the selected peer. Further, a subset of times during the paging interval monitored by the peer may be determined. For example, the subset may be a function (e.g., hash, map, . . . ) of an identifier of the peer. Moreover, the subset may be time varying. At 908, a paging message may be transmitted to the selected peer during the selected paging interval. Further, the paging message can be transmitted to the selected peer during the subset of times in the selected paging interval determined to be monitored by the peer. The paging message may include an identifier of the paged peer, an identifier of the wireless terminal paging the peer, a MAC ID for direct communication of traffic, quality of service (QoS) information, information pertaining to a type of communication (e.g., voice, data, gaming, . . . ) a portion of an identifier, a combination thereof, and the like. According to another example, additional information may be transmitted to the peer during a second segment of the paging interval and/or during a traffic interval (e.g., via broadcast); this additional information may enable resolving ambiguity associated with the intended recipient of the paging message (e.g., while mitigating an amount of bandwidth utilized for communicating the paging message during the subset of times).

Figure 10:
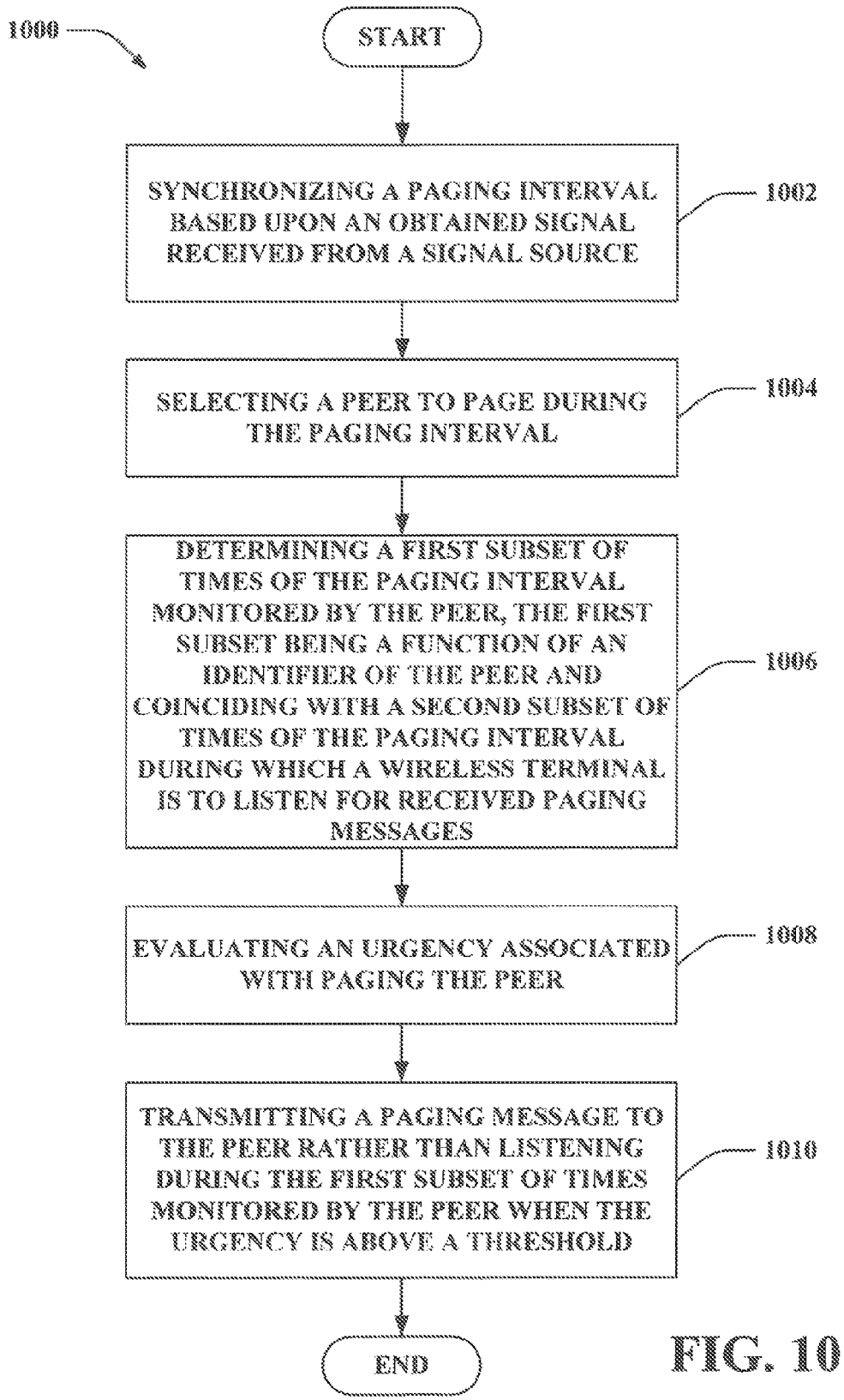
FIG. 10 is an illustration of an example methodology that facilitates evaluating whether to page a peer in a peer-to-peer environment.

With reference to FIG. 10, illustrated is a methodology 1000 that facilitates evaluating whether to page a peer in a peer-to-peer environment. At 1002, a paging interval may be synchronized based upon an obtained signal received from a signal source. At 1004, a peer to be paged during the paging interval may be selected. At 1006, a first subset of times of the paging interval monitored by the peer may be determined. The first subset may be a function of an identifier of the peer and may coincide with a second subset of times of the paging interval during which a wireless terminal is to listen for received paging messages. However, since the wireless terminal may operate in a half-duplex mode, the wireless terminal may either receive or transmit at a given time. At 1008, an urgency associated with paging the peer may be evaluated. For example, an analysis may be performed to determine whether a value of paging the peer exceeds a value of receiving a page from any peer of the wireless terminal. At 1010, a paging message may be transmitted to the peer rather than listening during the first subset of times monitored by the peer when the urgency is above a threshold (e.g., value of communicating with the peer exceeds value of missing a page from any peer). In another example, the wireless terminal does not perform an analysis. Instead, the wireless terminal decides to transmit the paging message and risks missing a potential page. In yet another example, the wireless terminal may delay the transmission of the paging message. The terminal may wait until a subsequent paging interval in which the terminal can transmit the paging message in a first subset of times and monitor for incoming paging message in a second subset of times, where the first and the second subsets do not substantially overlap.

Figure 11:
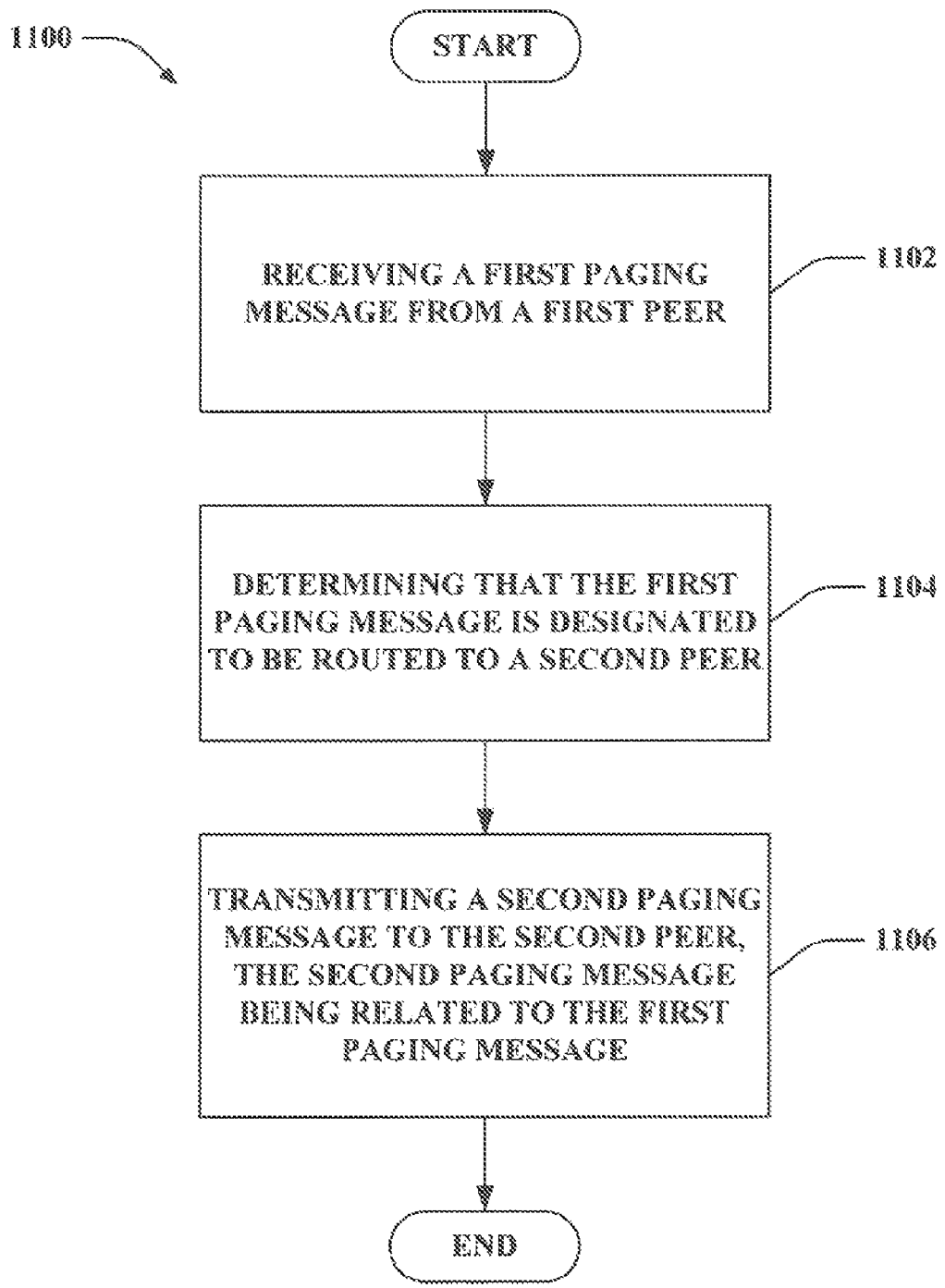
FIG. 11 is an illustration of an example methodology employed by a wireless terminal to facilitate routing multihop pages in a peer-to-peer environment.

Now referring to FIG. 11, illustrated is a methodology 1100 employed by a wireless terminal to facilitate routing multihop pages in a peer-to-peer environment. At 1102, a first paging message may be received from a first peer (e.g., source). The first paging message may include an identifier of the peer receiving the first page directly, an identifier of the first peer, an identifier of a second peer to which the paging message is ultimately destined to be transferred to (e.g., destination), a MAC ID for direct communication of traffic, quality of service (QoS) information, information pertaining to a type of communication (e.g., voice, data, gaming, . . . ) a portion of an identifier, a combination thereof, and the like. The wireless terminal acts as an intermediate node between the source and the destination. The method of transmitting and receiving the first paging message between the first peer and the wireless terminal is described above. For example, the first paging message may be received by the wireless terminal from the first peer during a first subset of times of a first paging interval monitored by the wireless terminal; the first subset of times may be a function of an identifier of the wireless terminal.

At 1104, it may be determined that the first paging message is designated to be routed to a second peer, which is different from the wireless terminal. For example, the first paging message may include an identifier of the second peer. By way of illustration, an evaluation may be performed to assess whether to send the first paging message to the second peer. Alternatively, the wireless terminal receiving the first paging message may identify itself as the ultimate destination; thus, the first paging message need not be further routed. At 1106, a second paging message may be transmitted to the second peer, where the second paging message may be related to the first paging message. By way of illustration, the second paging message may be generated and/or sent to the second peer as a function of the first paging message obtained from the first peer. Moreover, the second paging message may be sent when the evaluation of the first paging message reveals that the first paging message is to be routed to the second peer. The method of transmitting and receiving the second paging message between the wireless terminal and the second peer is described above. For example, the second paging message may be transmitted during a second subset of times of a second paging interval, where the second subset may be a function of an identifier of the second peer. The second paging interval may be different from the first paging interval. According to another example, traffic corresponding to the paging messages may similarly be routed between the first peer and the second peer.

Figure 12:
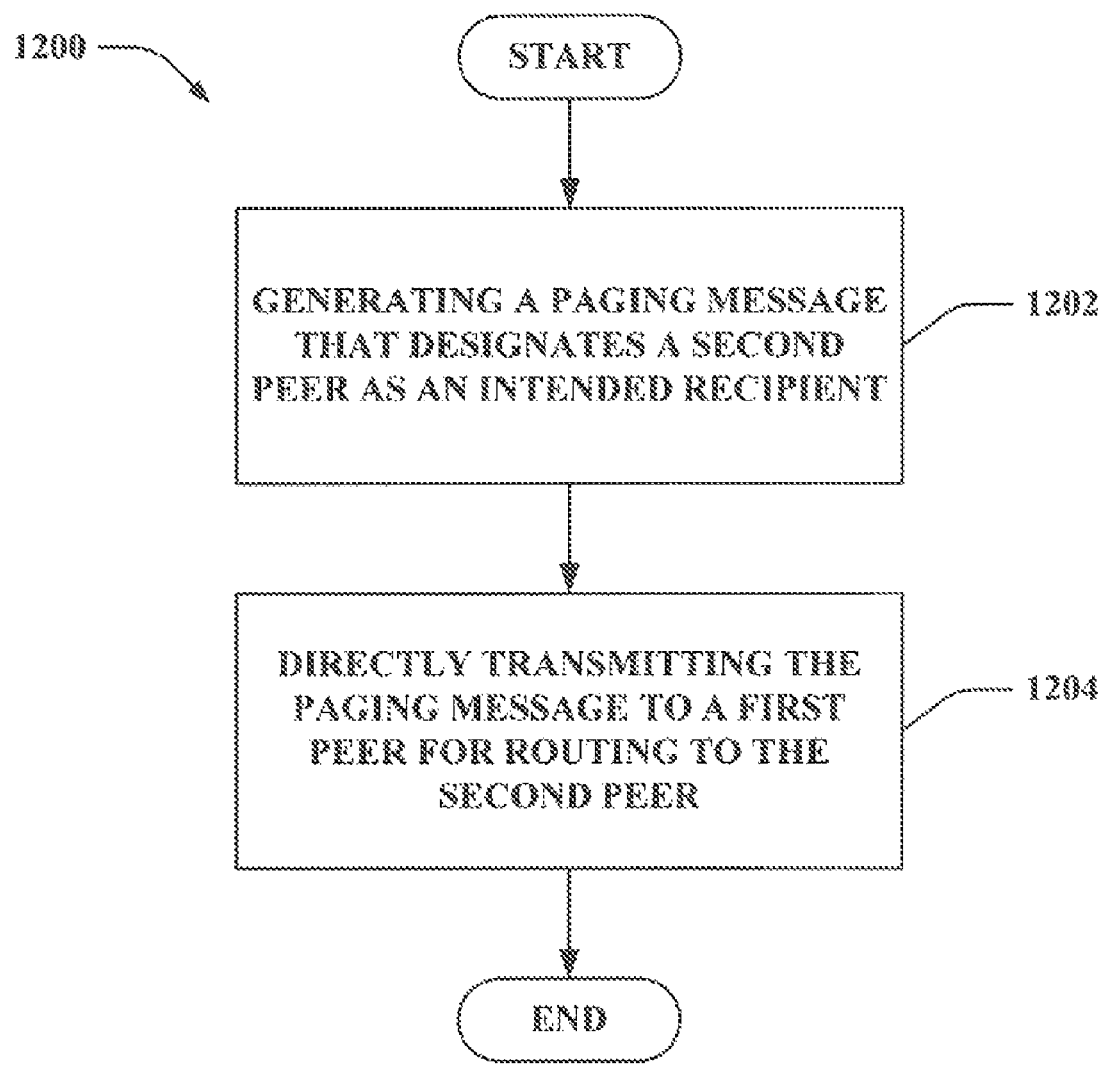
FIG. 12 is an illustration of an example methodology utilized by a wireless terminal to facilitate generating paging messages utilized for multihop paging in a peer-to-peer environment.

Turning to FIG. 12, illustrated is a methodology 1200 utilized by a wireless terminal to facilitate generating paging messages utilized for multihop paging in a peer-to-peer environment. At 1202, the wireless terminal (source) intends to page another terminal (second peer). A paging message may be generated that designates the second peer as an intended recipient (e.g., ultimate destination peer). For example, such designation may be provided by way of including an identifier of the second peer with the paging message. Further, the paging message may be generated for direct peer-to-peer communication to a first peer, which acts as an intermediate node between the source wireless terminal and the second peer. The paging message designates the second peer as the ultimate destination peer and the first peer as the immediate node to receive the direct paging message. At 1204, the paging message may be directly transmitted to a first peer for routing to the second peer. Accordingly, based upon the designation of the intended recipient, the first peer may identify that the paging message (or a disparate paging message based upon such paging message) is to be routed to the second peer. Based upon the paging message, traffic may be communicated between the second peer and a wireless terminal generating and transmitting the paging message. For instance, traffic may be communicated directly between the second peer and the wireless terminal. According to another example, traffic may traverse though the first peer when communicated between the second peer and the wireless terminal. Pursuant to another illustration, traffic indirectly transferred between the second peer and the wireless terminal may be passed through a disparate third peer (and/or a plurality of peers).

It will be appreciated that, in accordance with one or more aspects described herein, inferences can be made regarding directly paging peers in a peer-to-peer environment. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to determining when to transmit a paging message to a peer based upon an identifier of the peer. In accordance with another example, an inference may be made related to evaluating whether to listen for incoming paging messages or send a paging message to a peer based upon a probability of receiving a paging message and/or an urgency related to communication of traffic with the peer. It will be appreciated that the foregoing examples are illustrative in nature and are not intended to limit the number of inferences that can be made or the manner in which such inferences are made in conjunction with the various embodiments and/or methods described herein.

Figure 13:
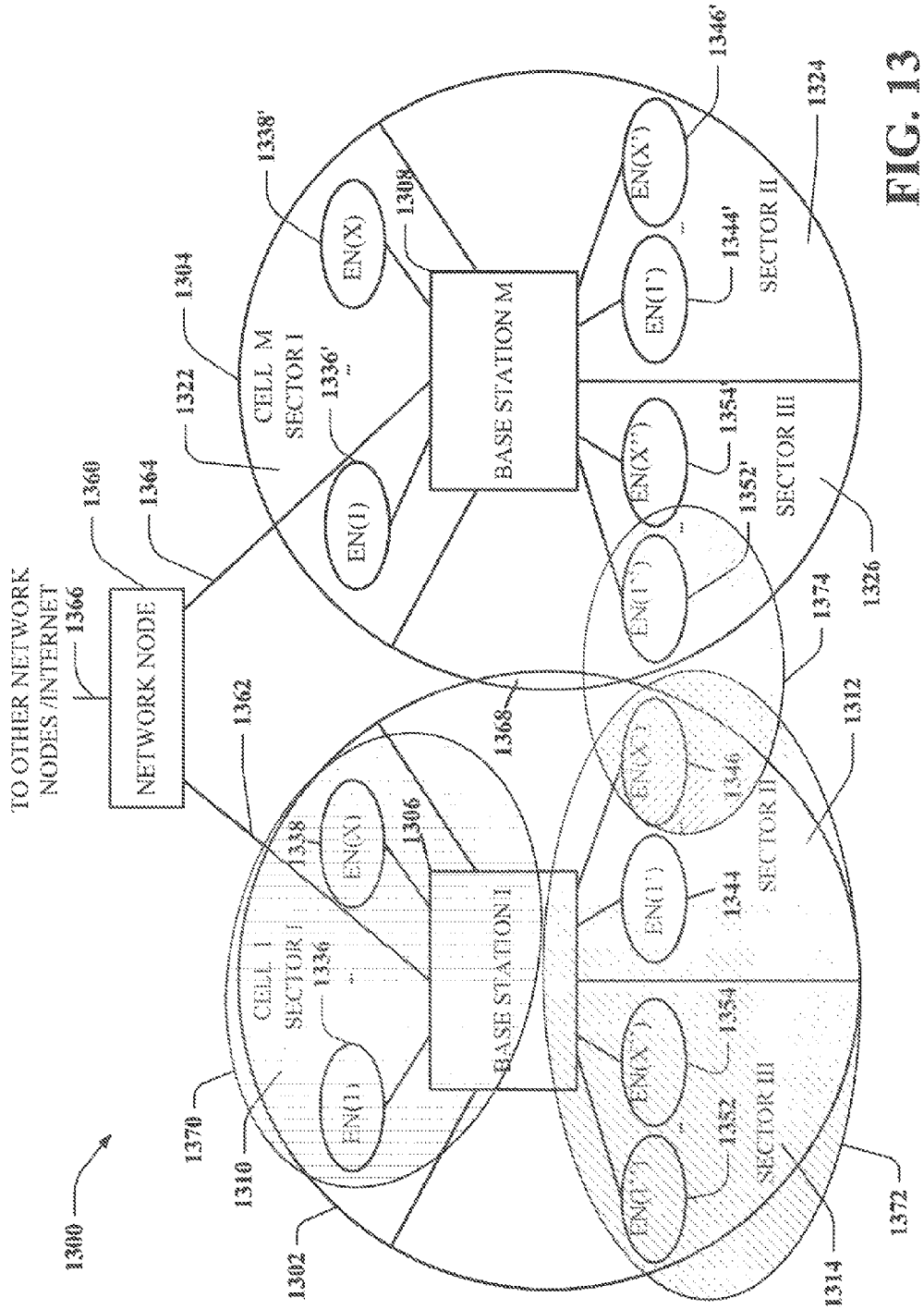
FIG. 13 is an illustration of an example communication system implemented in accordance with various aspects including multiple cells.

FIG. 13 depicts an example communication system 1300 implemented in accordance with various aspects including multiple cells: cell I 1302, cell M 1304. Note that neighboring cells 1302, 1304 overlap slightly, as indicated by cell boundary region 1368. Each cell 1302, 1304 of system 1300 includes three sectors. Cells which have not been subdivided into multiple sectors (N=1), cells with two sectors (N=2) and cells with more than 3 sectors (N>3) are also possible in accordance with various aspects. Cell 1302 includes a first sector, sector I 1310, a second sector, sector II 1312, and a third sector, sector III 1314. Each sector 1310, 1312, 1314 has two sector boundary regions; each boundary region is shared between two adjacent sectors.

Cell I 1302 includes a base station (BS), base station I 1306, and a plurality of end nodes (ENs) (e.g., wireless terminals) in each sector 1310, 1312, 1314. Sector I 1310 includes EN(1) 1336 and EN(X) 1338; sector II 1312 includes EN(1') 1344 and EN(X') 1346; sector III 1314 includes EN(1") 1352 and EN(X") 1354. Similarly, cell M 1304 includes base station M 1308, and a plurality of end nodes (ENs) in each sector 1322, 1324, 1326. Sector I 1322 includes EN(1) 1336' and EN(X) 1338'; sector II 1324 includes EN(1') 1344' and EN(X') 1346'; sector 3 1326 includes EN(1") 1352' and EN(X") 1354'.

System 1300 also includes a network node 1360 which is coupled to BS I 1306 and BS M 1308 via network links 1362, 1364, respectively. Network node 1360 is also coupled to other network nodes, e.g., other base stations, AAA server nodes, intermediate nodes, routers, etc. and the Internet via network link 1366. Network links 1362, 1364, 1366 may be, e.g., fiber optic cables. Each end node, e.g., EN(1) 1336 may be a wireless terminal including a transmitter as well as a receiver. The wireless terminals, e.g., EN(1) 1336 may move through system 1300 and may communicate via wireless links with the base station in the cell in which the EN is currently located. The wireless terminals, (WTs), e.g., EN(1) 1336, may communicate with peer nodes, e.g., other WTs in system 1300 or outside system 1300 via a base station, e.g., BS 1306, and/or network node 1360. WTs, e.g., EN(1) 1336 may be mobile communications devices such as cell phones, personal data assistants with wireless modems, etc.

Local area peer-to-peer communication may also be supported by communication system 1300. For example, a common spectrum may be utilized for both local area peer-to-peer communication as well as communication via the wide area network (e.g., cellular infrastructure network). Wireless terminals may communicate with other peers via a local area peer-to-peer network such as peer-to-peer networks 1370, 1372, and 1374. Although three peer-to-peer networks 1370-1374 are depicted, it is to be appreciated that any number, size, shape, etc. of peer-to-peer networks may be supported. For instance, each peer-to-peer network 1370-1374 may support transfer of signals directly between wireless terminals. Further, each peer-to-peer network 1370-1374 may include wireless terminals within a similar geographic area (e.g., within range of one another). For example, EN(1) 1336 may communicate with EN(X) 1338 by way of the local area peer-to-peer network 1370. However, it is to be appreciated that wireless terminals need not be associated with the same sector and/or cell to be included in a common peer-to-peer network. Further, peer-to-peer networks may overlap (e.g., EN(X') 1346 may leverage peer-to-peer networks 1372 and 1374). Additionally, some wireless terminals may not be supported by a peer-to-peer network. Wireless terminals may employ the wide area network and/or the peer-to-peer network where such networks overlap (e.g., concurrently or serially). Moreover, wireless terminals may seamlessly switch or concurrently leverage such networks. Accordingly, wireless terminals whether transmitting and/or receiving may selectively employ one or more of the networks to optimize communications.

Figure 14:
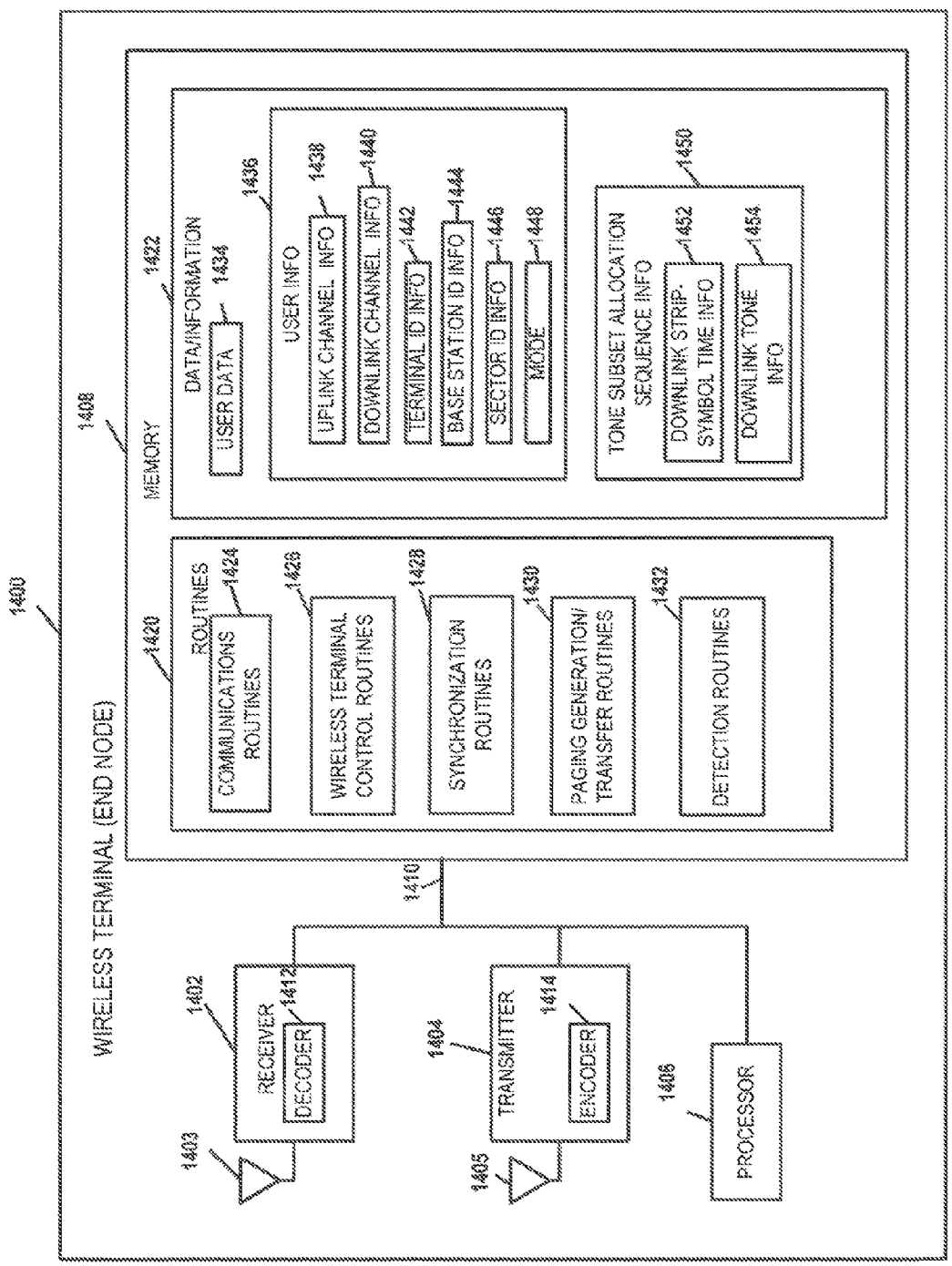
FIG. 14 is an illustration of an example wireless terminal (e.g., mobile device, end node, . . . ) implemented in accordance with various aspects described herein.

FIG. 14 illustrates an example wireless terminal (e.g., end node, mobile device, . . . ) 1400 which can be used as any one of the wireless terminals (e.g., end nodes, mobile devices, . . . ), e.g., EN(1) 1336, of the system 1300 shown in FIG. 13. Wireless terminal 1400 implements the tone subset allocation sequences. Wireless terminal 1400 includes a receiver 1402 including a decoder 1412, a transmitter 1404 including an encoder 1414, a processor 1406, and memory 1408 which are coupled together by a bus 1410 over which the various elements 1402, 1404, 1406, 1408 can interchange data and information. An antenna 1403 used for receiving signals from a base station (and/or a disparate wireless terminal) is coupled to receiver 1402. An antenna 1405 used for transmitting signals, e.g., to base station (and/or a disparate wireless terminal) is coupled to transmitter 1404.

The processor 1406 (e.g., a CPU) controls operation of wireless terminal 1400 and implements methods by executing routines 1420 and using data/information 1422 in memory 1408.

Data/information 1422 includes user data 1434, user information 1436, and tone subset allocation sequence information 1450. User data 1434 may include data, intended for a peer node, which will be routed to encoder 1414 for encoding prior to transmission by transmitter 1404 to base station, and data received from the base station which has been processed by the decoder 1412 in receiver 1402. User information 1436 includes uplink channel information 1438, downlink channel information 1440, terminal ID information 1442, base station ID information 1444, sector ID information 1446, and mode information 1448. Uplink channel information 1438 includes information identifying uplink channels segments that have been assigned by base station for wireless terminal 1400 to use when transmitting to the base station. Uplink channels may include uplink traffic channels, dedicated uplink control channels, e.g., request channels, power control channels and timing control channels. Each uplink channel includes one or more logic tones, each logical tone following an uplink tone hopping sequence. The uplink hopping sequences are different between each sector type of a cell and between adjacent cells. Downlink channel information 1440 includes information identifying downlink channel segments that have been assigned by base station to WT 1400 for use when BS is transmitting data/information to WT 1400. Downlink channels may include downlink traffic channels and assignment channels, each downlink channel including one or more logical tone, each logical tone following a downlink hopping sequence, which is synchronized between each sector of the cell.

User info 1436 also includes terminal ID information 1442, which is a base station assigned identification, base station ID information 1444 which identifies the specific base station that WT has established communications with, and sector ID info 1446 which identifies the specific sector of the cell where WT 1400 is presently located. Base station ID 1444 provides a cell slope value and sector ID info 1446 provides a sector index type; the cell slope value and sector index type may be used to derive tone hopping sequences. Mode information 1448 also included in user info 1436 identifies whether the WT 1400 is in sleep mode, hold mode, or on mode.

Tone subset allocation sequence information 1450 includes downlink strip-symbol time information 1452 and downlink tone information 1454. Downlink strip-symbol time information 1452 include the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone info 1454 includes information including a carrier frequency assigned to the base station, the number and frequency of tones, and the set of tone subsets to be allocated to the strip-symbol periods, and other cell and sector specific values such as slope, slope index and sector type.

Routines 1420 include communications routines 1424, wireless terminal control routines 1426, synchronization routines 1428, paging generation/transfer routines 1430, and detection routines 1432. Communications routines 1424 control the various communications protocols used by WT 1400. For example, communications routines 1424 may enable communicating via a wide area network (e.g., with base station) and/or a local area peer-to-peer network (e.g., directly with disparate wireless terminal(s)). By way of further example, communications routines 1424 may enable receiving a broadcast signal (e.g., from base station). Wireless terminal control routines 1426 control basic wireless terminal 1400 functionality including the control of the receiver 1402 and transmitter 1404. Synchronization routines 1428 control synchronizing wireless terminal 1400 to a received signal (e.g., from base station). Peers within a peer-to-peer network may also be synchronized to the signal. For example, the received signal may be a Beacon, a PN (pseudo random) sequence signal, a pilot signal, etc. Further, the signal may be periodically obtained and a protocol (e.g., associated with synchronization routines 1428) also known to peers may be utilized to identify intervals corresponding to distinct functions (e.g., peer discovery, paging, traffic). Paging generation/transfer routines 1430 control creating a paging message for transmission during a paging interval and/or determining when (e.g., subinterval(s)) an intended peer listens for paging messages. Moreover, paging generation/transfer routines 1430 may control sending the paging message to the peer during the determined subinterval(s). Detection routines 1432 control detection of paging messages originating from disparate wireless terminals (e.g., peers). Detection routines 1432 may determine subinterval(s) within a paging interval for wireless terminal 1400 to listen for incoming paging messages (e.g., based upon an identifier associated with wireless terminal 1400).

Figure 15:
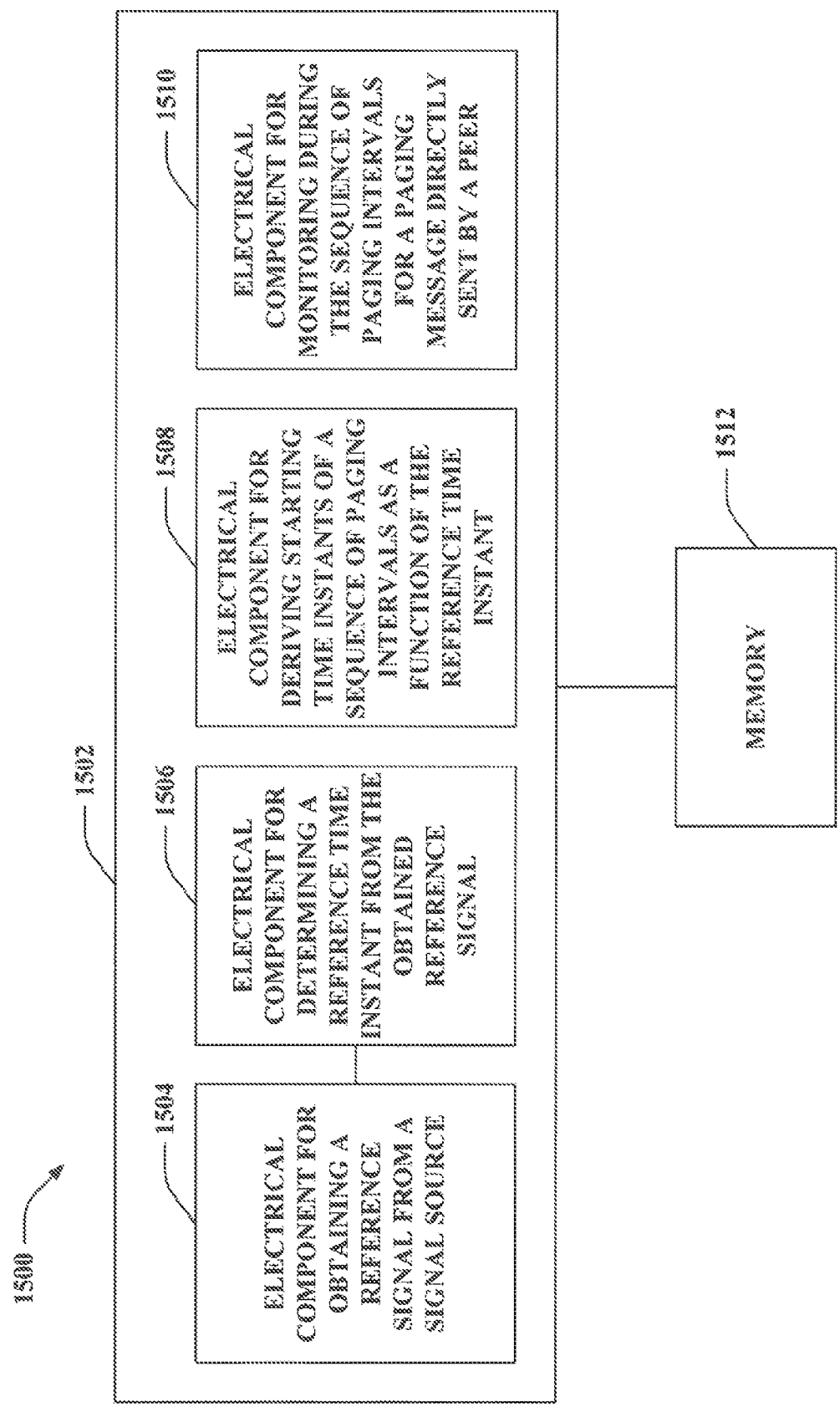
FIG. 15 is an illustration of an example system that enables communicating paging messages directly with a peer in a peer-to-peer network.

With reference to FIG. 15, illustrated is a system 1500 that enables communicating paging messages directly with a peer in a peer-to-peer network. For example, system 1500 may reside at least partially within a wireless terminal. It is to be appreciated that system 1500 is represented as including functional blocks, which may be functional blocks that represent functions implemented by a processor, software, or combination thereof (e.g., firmware). System 1500 includes a logical grouping 1502 of electrical components that can act in conjunction. For instance, logical grouping 1502 may include an electrical component for obtaining a reference signal from a signal source 1504. Pursuant to an illustration, the signal source may be a base station, an access point, a GPS satellite, and so forth. For example, the signal may be broadcast to the peer-to-peer network. Moreover, the peers may obtain a common notion of time based upon the received signal, and this common notion of time may be leveraged to synchronize the paging interval. Further, logical grouping 1502 may comprise an electrical component for determining a reference time instant from the obtained reference signal 1506. Moreover, logical grouping 1502 may include an electrical component for deriving starting time instants of a sequence of paging intervals as a function of the reference time instant 1508. Logical grouping 1502 may also comprise an electrical component for monitoring during the sequence of paging intervals for a paging message directly sent by a peer 1510. Additionally, system 1500 may include a memory 1512 that retains instructions for executing functions associated with electrical components 1504, 1506, 1508, and 1510. While shown as being external to memory 1512, it is to be understood that one or more of electrical components 1504, 1506, 1508, and 1510 may exist within memory 1512.

Figure 16:
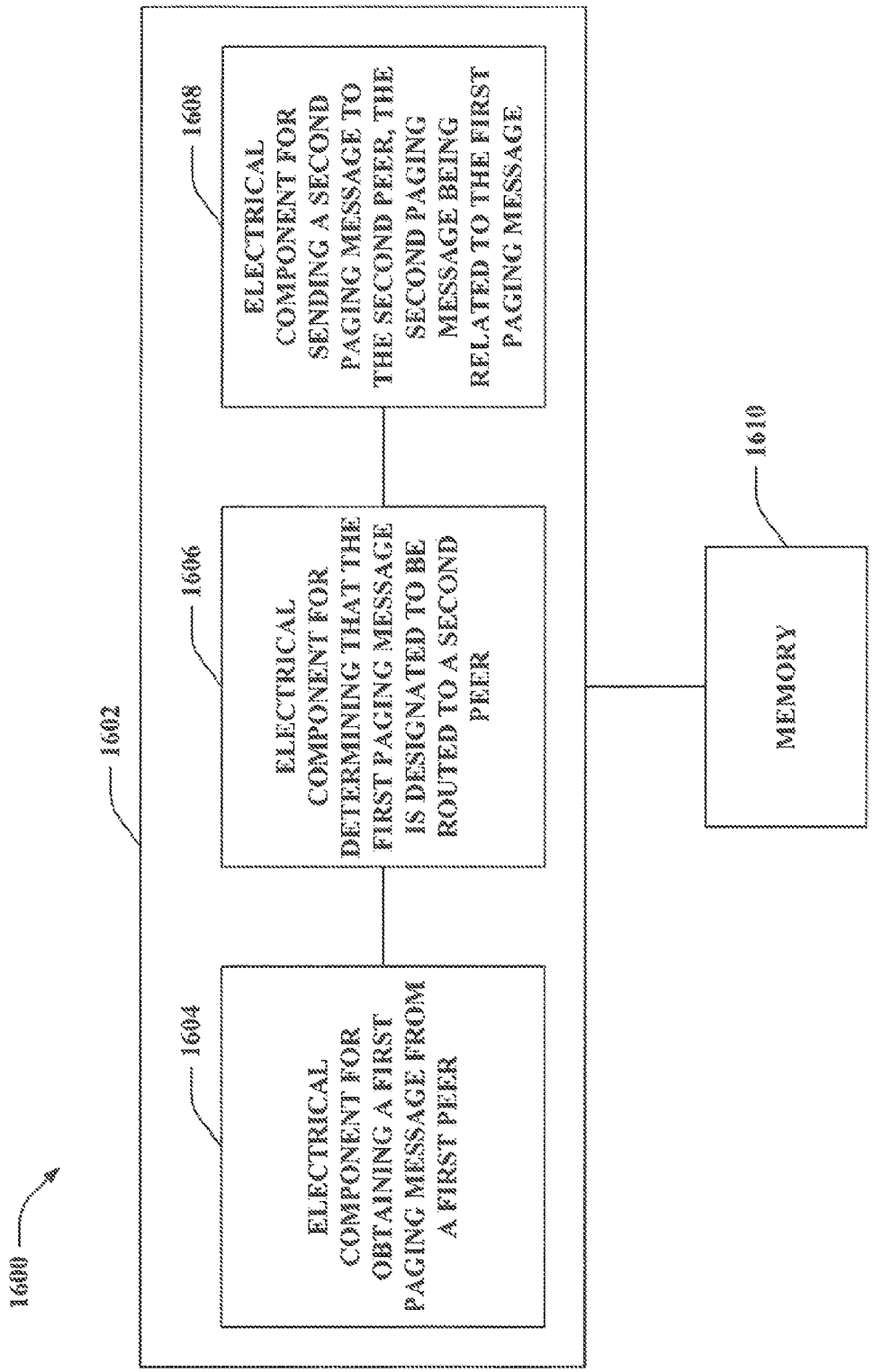
FIG. 16 is an illustration of an example system that enables routing paging messages in a peer-to-peer network.

With reference to FIG. 16, illustrated is a system 1600 that enables routing paging messages in a peer-to-peer network. For example, system 1600 may reside at least partially within a wireless terminal. It is to be appreciated that system 1600 is represented as including functional blocks, which may be functional blocks that represent functions implemented by a processor, software, or combination thereof (e.g., firmware). System 1600 includes a logical grouping 1602 of electrical components that can act in conjunction. For instance, logical grouping 1602 may include an electrical component for obtaining a first paging message from a first peer 1604. Pursuant to an illustration, the first paging message may include an identifier of a second peer to which the first paging message is to be forwarded. Further, logical grouping 1602 may comprise an electrical component for determining that the first paging message is designated to be routed to a second peer 1606. Moreover, logical grouping 1602 may include an electrical component for sending a second paging message to the second peer 1608. For example, the second paging message may be related to the first paging message. Additionally, system 1600 may include a memory 1610 that retains instructions for executing functions associated with electrical components 1604, 1606 and 1608. While shown as being external to memory 1610, it is to be understood that one or more of electrical components 1604, 1606 and 1608 may exist within memory 1610.

It is to be understood that the embodiments described herein may be implemented in hardware, software, firmware, middleware, microcode, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of operating a first wireless terminal for communicating paging messages directly with a second wireless terminal in a peer-to-peer network, comprising:
    obtaining a reference signal from a signal source;
    determining a reference time instant from the obtained reference signal;
    deriving starting time instants of a sequence of paging intervals as a function of the reference time instant; and
    monitoring during the sequence of paging intervals for a paging message directly sent by a peer,
    wherein monitoring during the sequence of paging intervals further comprises:
    determining a first subset of times during a particular paging interval in the sequence of paging intervals as a function of an identifier of the first wireless terminal; and
    monitoring the first subset of times during the particular paging interval for the paging message directly sent by the peer,
    wherein the method further comprises transmitting a disparate paging message to a disparate peer rather than monitoring for the paging message during the first subset of times when an urgency is above a threshold, the urgency being associated with paging the disparate peer when the first subset of times coincides with a second subset of times.

2. The method of claim 1, wherein a time duration of the first subset of times is less than 50% of a time duration of the particular paging interval.

3. The method of claim 2, further comprising:
    restraining from monitoring at least a portion of remaining times during the particular paging interval.

4. The method of claim 1, further comprising:
    determining a time variable from the obtained reference signal, a value of the time variable varying between one paging interval and a subsequent paging interval in the sequence of paging intervals; and
    determining the first subset of times as a function of the time variable of the paging interval.

5. The method of claim 1, further comprising evaluating content of the paging message received during the paging intervals to determine whether the first wireless terminal is an intended recipient.

6. The method of claim 5, further comprising comparing the identifier of the first wireless terminal with at least a portion of information bits received in the paging message.

7. The method of claim 1, further comprising employing content of the paging message received during the paging intervals to directly communicate traffic with the peer during a corresponding traffic interval.

8. The method of claim 7, wherein the paging message includes information pertaining to an identifier of the peer, an identifier of the first wireless terminal, a MAC identifier, a quality of service level, or a type of traffic.

9. The method of claim 1, further comprising receiving additional paging information during a disparate segment of the paging interval when the paging message is obtained during the paging intervals.

10. The method of claim 9, further comprising:
determining whether the paging message is intended for the first wireless terminal based upon the additional paging information; and
initiating direct communication of traffic with the peer during a corresponding traffic interval when the paging message is determined to be intended for the first wireless terminal.

11. The method of claim 1, further comprising:
receiving additional paging information from a broadcast during a traffic interval;
determine whether the paging message is intended for the first wireless terminal based upon the additional paging information; and
establishing an active peer-to-peer connection with the peer when the paging message is determined to be intended for the first wireless terminal.

12. The method of claim 1, further comprising:
selecting the disparate peer to page from a set of available peers;
selecting the paging interval from the sequence of paging intervals, the paging interval being monitored by the selected peer; and
transmitting the disparate paging message to the selected peer during the selected paging interval.

13. The method of 12, further comprising:
determining the second subset of times during the selected paging interval as a function of an identifier of the selected peer; and
transmitting the disparate paging message to the selected peer during the second subset of times in the selected paging interval.

14. The method of claim 1, wherein a first subinterval to be monitored by the first wireless terminal overlaps a second subinterval to be monitored by the disparate peer selected to be paged, and a particular interval in the sequence includes the first subinterval and the second subinterval.

15. The method of claim 14, further comprising transmitting a second paging message during the second subinterval to the disparate peer.

16. The method of claim 14, further comprising:
monitoring the first subinterval for incoming paging messages from the peer; and
selecting a subsequent, non-overlapping subinterval for transmitting a second paging message to the disparate peer.

17. A method of operating a first wireless terminal for communicating paging messages directly with a second wireless terminal in a peer-to-peer network, comprising:
obtaining a reference signal from a signal source;
determining a reference time instant from the obtained reference signal;
deriving starting time instants of a sequence of paging intervals as a function of the reference time instant; and
monitoring during the sequence of paging intervals for a paging message directly sent by a peer,
wherein monitoring during the sequence of paging intervals further comprises:
determining a first subset of times during a particular paging interval in the sequence of paging intervals as a function of an identifier of the first wireless terminal; and
monitoring the first subset of times during the particular paging interval for the paging message directly sent by the peer,
wherein the method further comprises:
selecting a disparate peer to page from a set of available peers;
selecting a paging interval from the sequence of paging intervals, the paging interval being monitored by the selected peer;
transmitting a disparate paging message to the selected peer during the selected paging interval;
determining a second subset of times during the selected paging interval as a function of an identifier of the selected peer;
transmitting the disparate paging message to the selected peer during the second subset of times in the selected paging interval;
evaluating an urgency associated with paging the disparate peer when the first subset of times coincides with the second subset of times; and
transmitting the disparate paging message to the disparate peer rather than monitoring for the paging message during the first subset of times when the urgency is above a threshold.

18. A wireless communications apparatus, comprising:
a memory that retains instructions related to obtaining a reference signal from a signal source, determining a reference time instant from the reference signal, deriving starting time instants of a sequence of paging intervals as a function of the reference time instant, and monitoring during the sequence of paging intervals for a paging message directly sent by a peer; and
a processor, coupled to the memory, configured to execute the instructions retained in the memory,
wherein monitoring during the sequence of paging intervals further comprises determining a first subset of times during a particular paging interval in the sequence of paging intervals as a function of an identifier of the wireless terminal and monitoring the first subset of times during the particular paging interval for the paging message directly sent by the peer,
wherein the memory further retains instructions related to transmitting a disparate paging message to a disparate peer rather than monitoring for the paging message during the first subset of times when an urgency is above a threshold, the urgency being associated with paging the disparate peer when the first subset of times coincides with a second subset of times.

19. The wireless communications apparatus of claim 18, wherein the memory further retains instructions for restraining from monitoring at least a portion of remaining times outside of the first subset of times.

20. The wireless communications apparatus of claim 18, wherein the memory further retains instructions for evaluating content of the paging message received during the paging intervals to determine whether the wireless terminal is an intended recipient.

21. The wireless communications apparatus of claim 18, wherein the memory further retains instructions for employing content of the paging message received during the paging intervals to directly communicate traffic with the peer during a corresponding traffic interval.

22. The wireless communications apparatus of claim 18, wherein the memory further retains instructions for receiving additional paging information during a disparate segment of the paging interval when the paging message is obtained during the paging intervals, determining whether the paging message is intended for the wireless terminal based upon the additional paging information, and initiating direct communication of traffic with the peer during a corresponding traffic interval when the paging message is determined to be intended for the wireless terminal.

23. The wireless communications apparatus of claim 18, wherein the memory further retains instructions for receiving additional paging information from a broadcast during a traffic interval, determine whether the paging message is intended for the wireless terminal based upon the additional paging information, and establishing an active peer-to-peer connection with the peer when the paging message is determined to be intended for the wireless terminal.

24. The wireless communications apparatus of claim 18, wherein the memory further retains instructions for selecting the disparate peer to page from a set of available peers, selecting the paging interval from the sequence of paging intervals, the paging interval being monitored by the selected peer, and transmitting the disparate paging message to the selected peer during the selected paging interval.

25. The wireless communications apparatus of claim 24, wherein the memory further retains instructions for determining the second subset of times during the selected paging interval as a function of an identifier of the selected peer and transmitting the disparate paging message to the selected peer during the second subset of times in the selected paging interval.

26. A wireless communications apparatus, comprising:
a memory that retains instructions related to obtaining a reference signal from a signal source, determining a reference time instant from the reference signal, deriving starting time instants of a sequence of paging intervals as a function of the reference time instant, and monitoring during the sequence of paging intervals for a paging message directly sent by a peer; and
a processor, coupled to the memory, configured to execute the instructions retained in the memory,
wherein monitoring during the sequence of paging intervals further comprises determining a first subset of times during a particular paging interval in the sequence of paging intervals as a function of an identifier of the wireless terminal and monitoring the first subset of times during the particular paging interval for the paging message directly sent by the peer,
wherein the memory further retains instructions related to selecting a disparate peer to page from a set of available peers; selecting a paging interval from the sequence of paging intervals, the paging interval being monitored by the selected peer; transmitting a disparate paging message to the selected peer during the selected paging interval; determining a second subset of times during the selected paging interval as a function of an identifier of the selected peer; transmitting the disparate paging message to the selected peer during the second subset of times in the selected paging interval; evaluating an urgency associated with paging the disparate peer when the subset of times coincides with the second subset of times; and transmitting the disparate paging message to the disparate peer rather than monitoring for the paging message during the first subset of times when the urgency is above a threshold.

27. A wireless communications apparatus that enables communicating paging messages directly with a peer in a peer-to-peer network, comprising:
means for obtaining a reference signal from a signal source;
means for determining a reference time instant from the obtained reference signal;
means for deriving starting time instants of a sequence of paging intervals as a function of the reference time instant; and
means for monitoring during the sequence of paging intervals for a paging message directly sent by a peer,
wherein the means for monitoring during the sequence of paging intervals further comprises:
means for determining a first subset of times during a particular paging interval in the sequence of paging intervals as a function of an identifier of the wireless terminal; and
means for monitoring the first subset of times during the particular paging interval for the paging message directly sent by the peer,
wherein the wireless communications apparatus further comprises means for transmitting a disparate paging message to a disparate peer rather than monitoring for the paging message during the first subset of times when the urgency is above a threshold, the urgency being associated with paging the disparate peer when the first subset of times coincides with a second subset of times.

28. The wireless communications apparatus of claim 27, further comprising means for evaluating content of the paging message received during the paging intervals to determine whether the wireless terminal is an intended recipient.

29. The wireless communications apparatus of claim 27, further comprising means for employing content of the paging message received during the paging intervals to directly communicate traffic with the peer during a corresponding traffic interval.

30. The wireless communications apparatus of claim 27, further comprising:
means for receiving additional paging information during a disparate segment of the paging interval when the paging message is obtained during the paging intervals;
means for determining whether the paging message is intended for the wireless terminal based upon the additional paging information; and
means for initiating direct communication of traffic with the peer during a corresponding traffic interval when the paging message is determined to be intended for the wireless terminal.

31. The wireless communications apparatus of claim 27, further comprising:
means for receiving additional paging information from a broadcast during a traffic interval;
means for determining whether the paging message is intended for the wireless terminal based upon the additional paging information; and
means for establishing an active peer-to-peer connection with the peer when the paging message is determined to be intended for the wireless terminal.

32. The wireless communications apparatus of claim 27, further comprising:
means for selecting the disparate peer to page from a set of available peers;

means for selecting the paging interval from the sequence of paging intervals, the paging interval being monitored by the selected peer; and
means for transmitting the disparate paging message to the selected peer during the selected paging interval.

33. The wireless communications apparatus of claim 32, further comprising:
means for determining the second subset of times during the selected paging interval as a function of an identifier of the selected peer; and
means for transmitting the disparate paging message to the selected peer during the second subset of times in the selected paging interval.

34. A wireless communications apparatus that enables communicating paging messages directly with a peer in a peer-to-peer network, comprising:
means for obtaining a reference signal from a signal source;
means for determining a reference time instant from the obtained reference signal;
means for deriving starting time instants of a sequence of paging intervals as a function of the reference time instant; and
means for monitoring during the sequence of paging intervals for a paging message directly sent by a peer,
wherein the means for monitoring during the sequence of paging intervals further comprises:
means for determining a first subset of times during a particular paging interval in the sequence of paging intervals as a function of an identifier of the wireless terminal; and
means for monitoring the first subset of times during the particular paging interval for the paging message directly sent by the peer,
wherein the wireless communications apparatus further comprises:
means for selecting a disparate peer to page from a set of available peers;
means for selecting a paging interval from the sequence of paging intervals, the paging interval being monitored by the selected peer;
means for transmitting a disparate paging message to the selected peer during the selected paging interval;
means for determining a second subset of times during the selected paging interval as a function of an identifier of the selected peer;
means for transmitting the disparate paging message to the selected peer during the second subset of times in the selected paging interval;
means for evaluating an urgency associated with paging the disparate peer when the first subset of times coincides with the second subset of times; and
means for transmitting the disparate paging message to the disparate peer rather than monitoring for the paging message during the first subset of times when the urgency is above a threshold.

35. A non-transitory machine-readable medium having stored thereon machine-executable instructions for:
obtaining a reference signal from a signal source;
determining a reference time instant from the obtained reference signal;
deriving starting time instants of a sequence of paging intervals as a function of the reference time instant; and
monitoring during the sequence of paging intervals for a paging message directly sent by a peer,
wherein the machine-executable instructions for monitoring during the sequence of paging intervals further comprise instructions for:
determining a first subset of times during a particular paging interval in the sequence of paging intervals as a function of an identifier of the wireless terminal; and
monitoring the first subset of times during the particular paging interval for the paging message directly sent by a peer,
wherein the machine-executable instructions further comprise instructions for transmitting a disparate paging message to a disparate peer rather than monitoring for the paging message during the first subset of times when an urgency is above a threshold, the urgency being associated with paging the disparate peer when the first subset of times coincides with a second subset of times.

36. The machine-readable medium of claim 35, the machine-executable instructions further comprise evaluating content of the paging message received during the paging intervals to determine whether the wireless terminal is an intended recipient.

37. The machine-readable medium of claim 35, the machine-executable instructions further comprise employing content of the paging message received during the paging intervals to directly communicate traffic with the peer during a corresponding traffic interval.

38. The machine-readable medium of claim 35, the machine-executable instructions further comprise:
receiving additional paging information during a disparate segment of the paging interval when the paging message is obtained during the paging intervals;
determining whether the paging message is intended for the wireless terminal based upon the additional paging information; and
initiating direct communication of traffic with the peer during a corresponding traffic interval when the paging message is determined to be intended for the wireless terminal.

39. The machine-readable medium of claim 35, the machine-executable instructions further comprise:
receiving additional paging information from a broadcast during a traffic interval;
determine whether the paging message is intended for the wireless terminal based upon the additional paging information; and
establishing an active peer-to-peer connection with the peer when the paging message is determined to be intended for the wireless terminal.

40. The machine-readable medium of claim 35, the machine-executable instructions further comprise:
selecting the disparate peer to page from a set of available peers;
selecting the paging interval from the sequence of paging intervals, the paging interval being monitored by the selected peer; and
transmitting the disparate paging message to the selected peer during the selected paging interval.

41. The machine-readable medium of claim 40, the machine-executable instructions further comprise:
determining the second subset of times during the selected paging interval as a function of an identifier of the selected peer; and
transmitting the disparate paging message to the selected peer during the second subset of times in the selected paging interval.

42. A non-transitory machine-readable medium having stored thereon machine-executable instructions for:
- obtaining a reference signal from a signal source;
- determining a reference time instant from the obtained reference signal;
- deriving starting time instants of a sequence of paging intervals as a function of the reference time instant; and
- monitoring during the sequence of paging intervals for a paging message directly sent by a peer,
- wherein the machine-executable instructions for monitoring during the sequence of paging intervals further comprise instructions for:
- determining a first subset of times during a particular paging interval in the sequence of paging intervals as a function of an identifier of the wireless terminal; and
- monitoring the first subset of times during the particular paging interval for the paging message directly sent by a peer;
- wherein the machine-executable instructions further comprise instructions for:
- selecting a disparate peer to page from a set of available peers;
- selecting a paging interval from the sequence of paging intervals, the paging interval being monitored by the selected peer;
- transmitting a disparate paging message to the selected peer during the selected paging interval;
- determining a second subset of times during the selected paging interval as a function of an identifier of the selected peer;
- transmitting the disparate paging message to the selected peer during the second subset of times in the selected paging interval;
- evaluating an urgency associated with paging the disparate peer when the first subset of times coincides with the second subset of times; and
- transmitting the disparate paging message to the disparate peer rather than monitoring for the paging message during the first subset of times when the urgency is above a threshold.

43. In a wireless communication system, an apparatus comprising:
- a processor configured to:
  - obtain a reference signal from a signal source;
  - determine a reference time instant from the obtained reference signal;
  - derive starting time instants of a sequence of paging intervals as a function of the reference time instant; and
  - monitor during the sequence of paging intervals for a paging message directly sent by a peer,
- wherein to monitor during the sequence of paging intervals, the processor is further configured to:
- determine a first subset of times during a particular paging interval in the sequence of paging intervals as a function of an identifier of the first wireless terminal; and
- monitor the first subset of times during the particular paging interval for the paging message directly sent by the peer,
- wherein the processor is further configured to transmit a disparate paging message to a disparate peer rather than monitoring for the paging message during the first subset of times when an urgency is above a threshold, the urgency being associated with paging the disparate peer when the first subset of times coincides with a second subset of times.

* * * * *